United States Patent
Huang et al.

(10) Patent No.: US 11,796,765 B2
(45) Date of Patent: Oct. 24, 2023

(54) OPTICAL IMAGING SYSTEM

(71) Applicant: ZHEJIANG SUNNY OPTICAL CO., LTD, Ningbo (CN)

(72) Inventors: Wenbo Huang, Ningbo (CN); Lingbo He, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 511 days.

(21) Appl. No.: 17/031,628

(22) Filed: Sep. 24, 2020

(65) Prior Publication Data
US 2021/0109324 A1 Apr. 15, 2021

(30) Foreign Application Priority Data
Oct. 14, 2019 (CN) .................... 201910972926.X

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC ........ A61K 31/496; A61P 25/00; A61P 25/16; A61P 25/18; A61P 25/22; A61P 25/24; A61P 25/28; C07D 209/10; C07D 235/10; C07D 403/10; C07D 405/06; C07D 405/14; C07D 409/14; C07D 417/14; G02B 13/0045; G02B 9/64
See application file for complete search history.

(56) References Cited

U.S. PATENT DOCUMENTS

| | | | |
|---|---|---|---|
| 2016/0124191 A1* | 5/2016 | Hashimoto | G02B 13/0045 359/708 |
| 2018/0106985 A1 | 4/2018 | Chang et al. | |
| 2018/0149835 A1* | 5/2018 | Park | G02B 13/0045 |
| 2018/0275320 A1 | 9/2018 | Hsieh et al. | |
| 2019/0025600 A1 | 1/2019 | Tang et al. | |
| 2019/0056569 A1* | 2/2019 | Yoo | G02B 9/64 |

FOREIGN PATENT DOCUMENTS

CN 207249226 U 4/2018

OTHER PUBLICATIONS

Liu, Yin Ting; "Review and Design a Mobile Phone Camera Lens For 21.4 Mega-Pixels Image Sensor"; College of Optical Science, University of Optical Science, University of Arizona, USA; Nov. 30, 2021; pp. 1-45.
Office Action issued in corresponding Indian Patent Application No. 202014040412; dated Dec. 2, 2021; 8 pgs.

* cited by examiner

*Primary Examiner* — Joseph P Martinez
*Assistant Examiner* — Vipin Patel
(74) *Attorney, Agent, or Firm* — HAUPTMAN HAM, LLP

(57) ABSTRACT

The present disclosure discloses an optical imaging system including, sequentially from an object side to an image side along an optical axis, a first lens, a second lens, a third lens, a fourth lens, a fifth lens, a sixth lens and a seventh lens, each of which has refractive power. Each of the first lens, the third lens and the fourth lens has positive refractive power. Half of a diagonal length ImgH on an imaging plane of the optical imaging system satisfies ImgH>5 mm. A total effective focal length f of the optical imaging system and an effective focal length f3 of the third lens satisfy 2.0<f3/f<3.0.

19 Claims, 12 Drawing Sheets

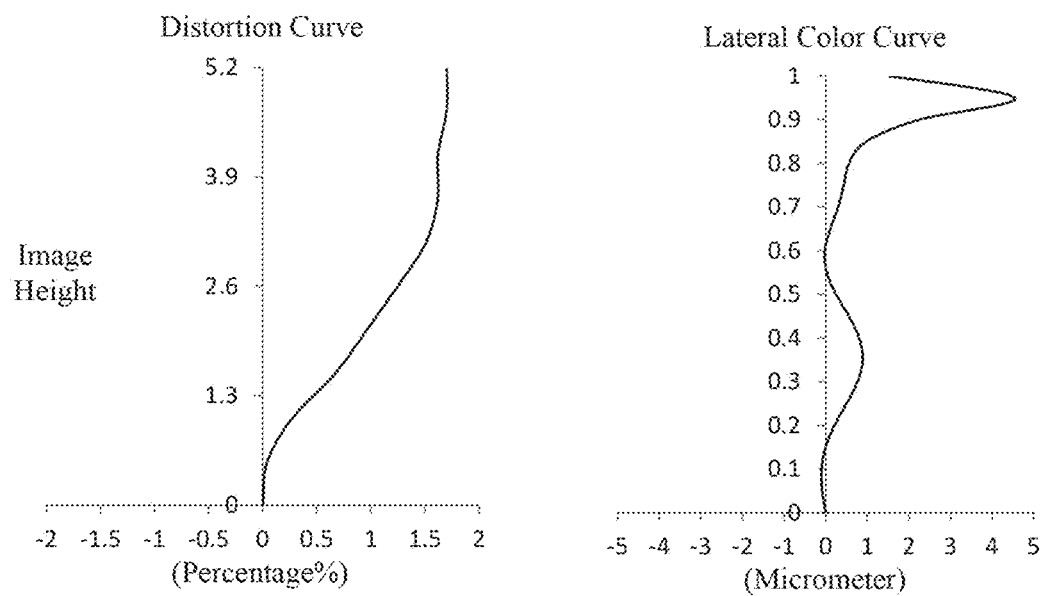
Fig. 2C
Fig. 2D
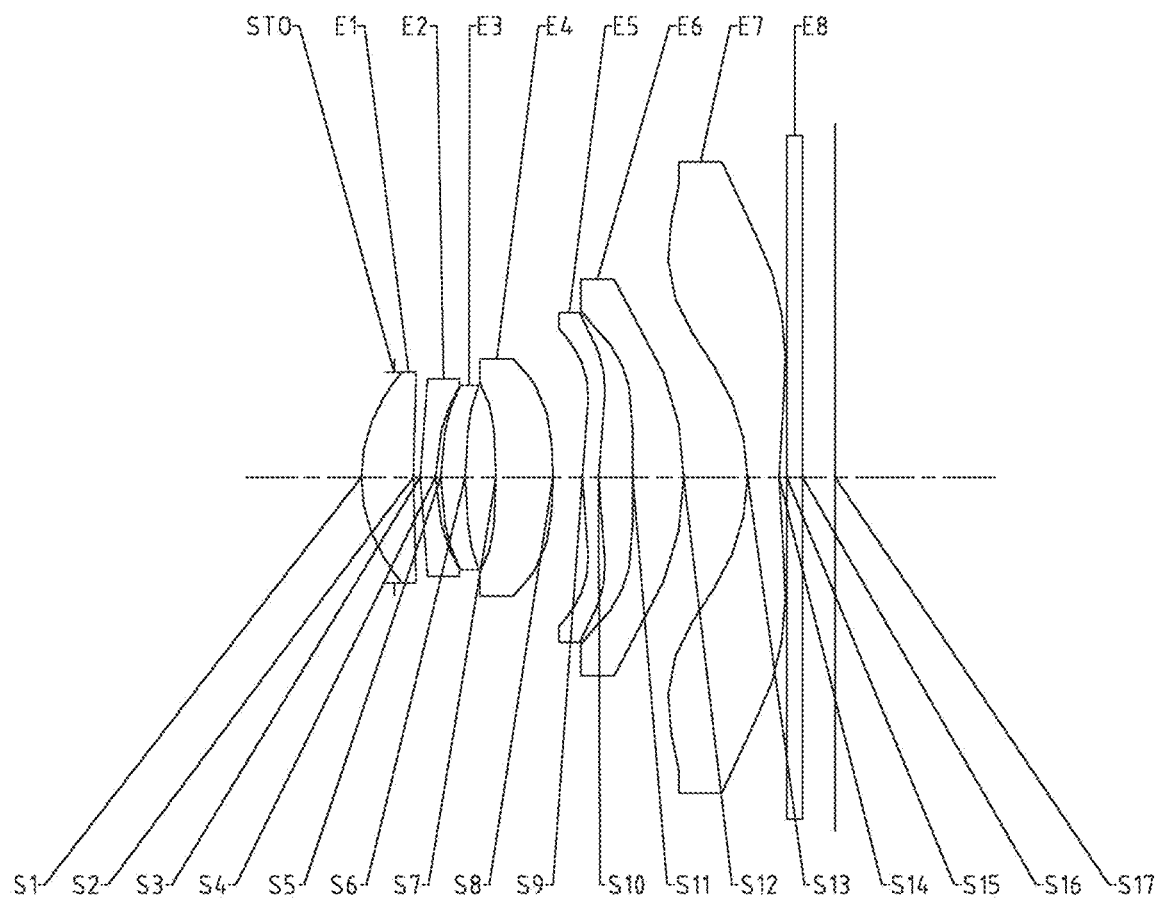
Fig. 3

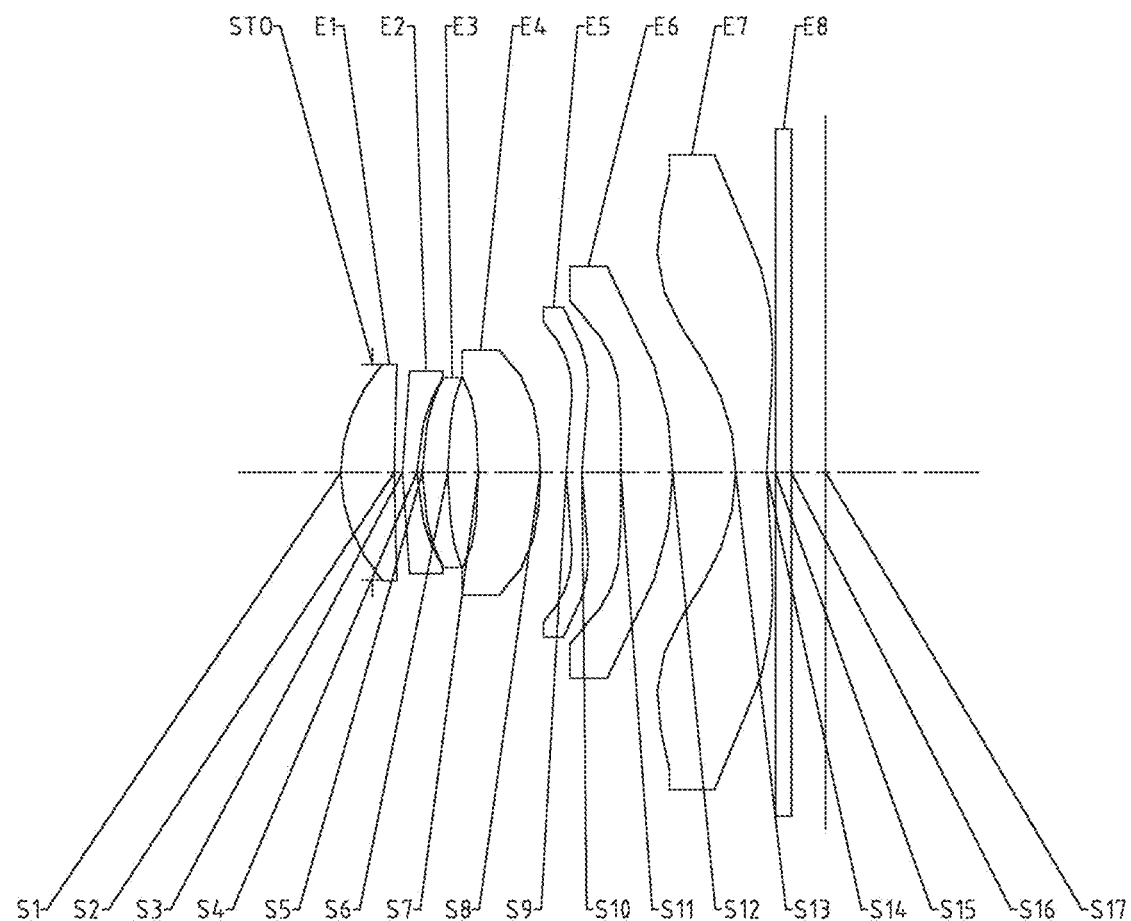
Fig. 5
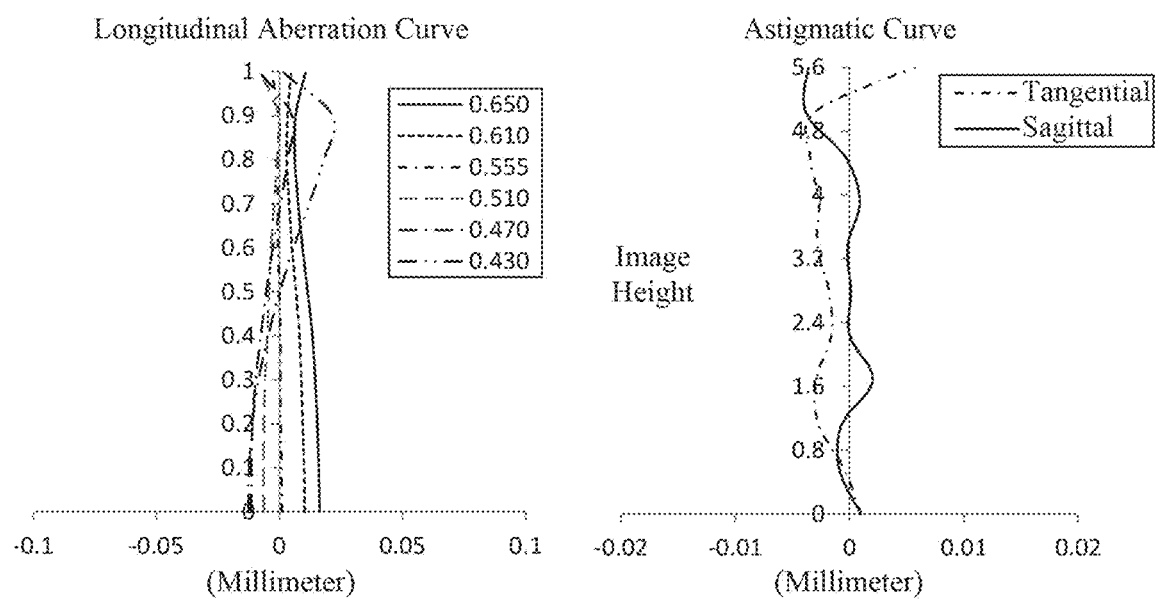
Fig. 6A                    Fig. 6B

OPTICAL IMAGING SYSTEM

CROSS-REFERENCE TO RELATED APPLICATION

This application claims benefit of priority to Chinese Patent Application No. 201910972926.X filed on Oct. 14, 2019 before the China National Intellectual Property Administration, the entire disclosure of which is incorporated herein by reference in its entity.

TECHNICAL FIELD

The present disclosure relates to the field of optical elements, and more specifically, relates to an optical imaging system.

BACKGROUND

In recent years, with the development of science and technology, the market demand for the optical imaging system suitable for portable electronic products (such as mobile phones) has gradually increased. The optical imaging system with high image quality are becoming more and more popular. At the same time, with the continuous advancement of image sensor technology, the number of pixels on the image sensor increases and the size of a single pixel decreases, which also requires the optical imaging system to have higher imaging performance.

Currently, portable electronic products are usually thin and light. For example, the thickness of mobile phones is only a few millimeters. The lightness and thinness of the product limits the total optical length of the optical imaging system mounted thereon, thereby increasing the design difficulty for the optical imaging system.

In order to meet the requirements of miniaturization and imaging requirements, an optical imaging system that can simultaneously satisfy the characteristics of large image plane, high image quality and miniaturization is required.

SUMMARY

The present disclosure provides an optical imaging system that is applicable to portable electronic products and at least solves or partially solves at least one of the above disadvantages of the prior art.

The present disclosure provides an optical imaging system. The optical imaging system includes, sequentially from an object side to an image side along an optical axis, a first lens, a second lens, a third lens, a fourth lens, a fifth lens, a sixth lens and a seventh lens, each of which has refractive power. Each of the first lens, the third lens and the fourth lens may have positive refractive power.

In one embodiment, half of a diagonal length ImgH on an imaging plane of the optical imaging system may satisfy ImgH>5 mm.

A total effective focal length f of the optical imaging system and an effective focal length f3 of the third lens may satisfy 2.0<f3/f<3.0.

In one embodiment, an effective focal length f2 of the second lens and an effective focal length f7 of the seventh lens may satisfy 1.5<f2/f7<2.0.

In one embodiment, an effective focal length f1 of the first lens and an effective focal length f6 of the sixth lens may satisfy 1.1<f6/f1<2.0.

In one embodiment, a radius of curvature R3 of an object-side surface of the second lens and a radius of curvature R4 of an image-side surface of the second lens may satisfy 2.5<R3/R4<4.0.

In one embodiment, a radius of curvature R5 of an object-side surface of the third lens and a radius of curvature R6 of an image-side surface of the third lens may satisfy 1.4<R6/R5<2.0.

In one embodiment, a radius of curvature R7 of an object-side surface of the fourth lens and a radius of curvature R8 of an image-side surface of the fourth lens may satisfy 1.0<R7/R8<2.0.

In one embodiment, a radius of curvature R12 of an image-side surface of the sixth lens and a radius of curvature R13 of an object-side surface of the seventh lens may satisfy 1.2<R12/R13<3.1.

In one embodiment, a radius of curvature R1 of an object-side surface of the first lens, a radius of curvature R9 of an object-side surface of the fifth lens and a radius of curvature R10 of an image-side surface of the fifth lens may satisfy 1.5<(R1+R9)/R10<2.5.

In one embodiment, a center thickness CT1 of the first lens along the optical axis and a center thickness CT2 of the second lens along the optical axis may satisfy 3.0<CT1/CT2<4.0.

In one embodiment, a center thickness CT4 of the fourth lens along the optical axis and a center thickness CT3 of the third lens along the optical axis may satisfy 1.5<CT4/CT3<3.5.

In one embodiment, a center thickness CT6 of the sixth lens along the optical axis and a center thickness CT7 of the seventh lens along the optical axis may satisfy 1.3<CT6/CT7≤2.8.

In one embodiment, a spaced interval T56 between the fifth lens and the sixth lens along the optical axis and a spaced interval T67 between the sixth lens and the seventh lens along the optical axis may satisfy 1.5<T67/T56<3.6.

In one embodiment, a spaced interval T34 between the third lens and the fourth lens along the optical axis and a spaced interval T45 between the fourth lens and the fifth lens along the optical axis may satisfy 0.5<T34/T45<1.5.

In one embodiment, a refractive index n2 of the second lens may satisfy n2>1.6, a refractive index n3 of the third lens may satisfy n3>1.6, and a refractive index n5 of the fifth lens may satisfy n5>1.6.

The present disclosure employs seven lenses, and the optical imaging system has at least one beneficial effect, such as miniaturization, large image plane, and high image quality, by rationally configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings:

FIGS. 2A to 2D illustrate a longitudinal aberration curve, an astigmatic curve, a distortion curve, and a lateral color curve of the optical imaging system of the example 1, respectively.

FIG. 3 illustrates a schematic structural view of an optical imaging system according to example 2 of the present disclosure.

FIG. 5 illustrates a schematic structural view of an optical imaging system according to example 3 of the present disclosure; and FIGS. 6A to 6D illustrate a longitudinal aberration curve, an astigmatic curve, a distortion curve, and a lateral color curve of the optical imaging system of the example 3, respectively.

DETAILED DESCRIPTION OF EMBODIMENTS

Figure 1:
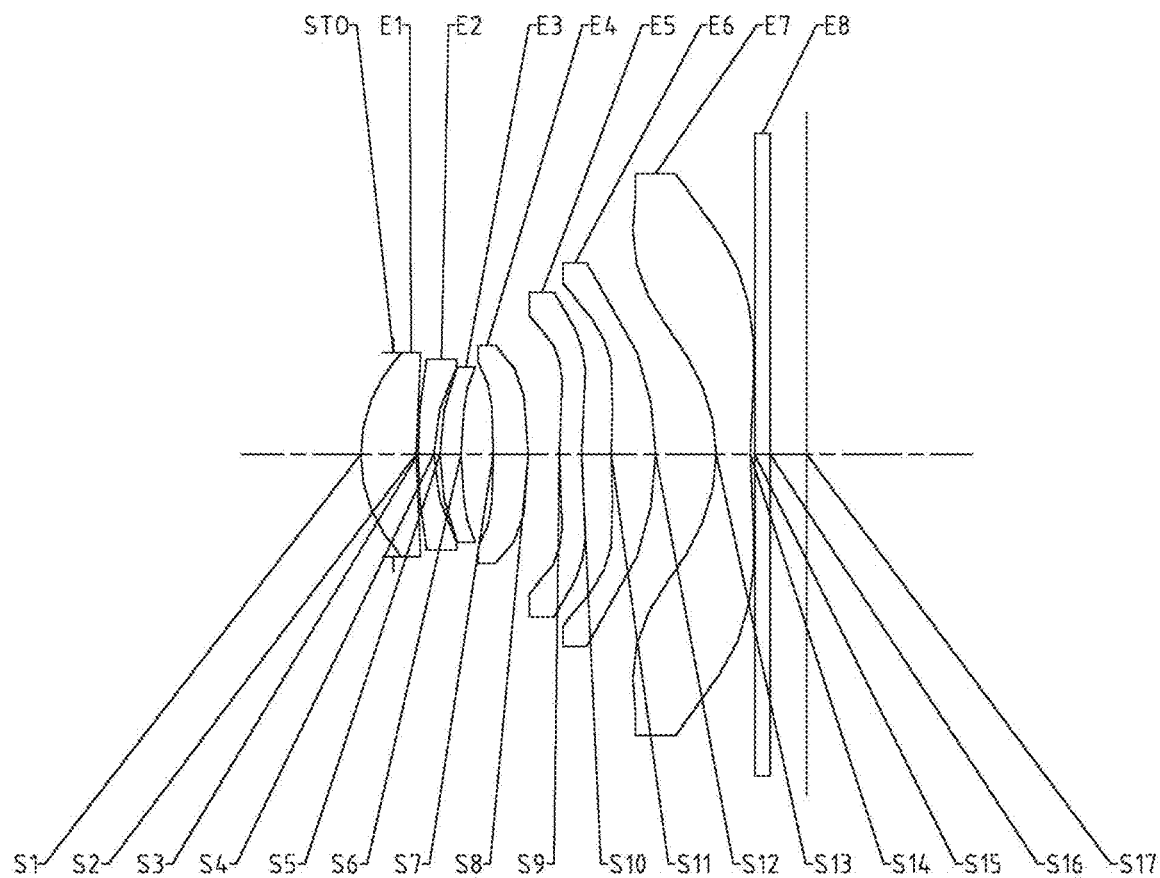
FIG. 1 illustrates a schematic structural view of an optical imaging system according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging system according to an exemplary embodiment of the present disclosure may include, for example, seven lenses having refractive power, which are a first lens, a second lens, a third lens, a fourth lens, a fifth lens, a sixth lens and a seventh lens. The seven lenses are arranged sequentially from an object side to an image side along an optical axis. Among the first lens to the seventh lens, there may be an air interval between each two adjacent lenses.

In an exemplary embodiment, the above optical imaging system may further include at least one stop. The stop may be disposed at an appropriate position as required, for example, between the object side and the first lens. Optionally, the optical imaging system may further include an optical filter for correcting the color deviation and/or a protective glass for protecting the photosensitive element located on an imaging plane.

In an exemplary embodiment, the first lens may have positive refractive power; the second lens may have positive and negative refractive power; the third lens may have positive refractive power; the fourth lens may have positive refractive power; the fifth lens may have positive and negative refractive power; the sixth lens may have positive and negative refractive power; and the seventh lens may have positive and negative refractive power. The low-order aberrations of the system are effectively compensated by rationally controlling the positive or negative refractive power and the surface curvature of each component in the system. The first lens having positive refractive power is beneficial to converging the incident light of the optical imaging system. By configuring the third lens to have positive refractive power, it is beneficial to reduce the incident angle of the light at the position of the stop, reduce pupil aberration, and thereby improving the image quality of the optical imaging system. By configuring the fourth lens to have positive refractive power, it is beneficial to shorten the total optical length of the optical imaging system, thereby miniaturizing the optical imaging system.

In an exemplary embodiment, the optical imaging system according to the present disclosure may satisfy: ImgH>5 mm, where ImgH is half of a diagonal length on an imaging plane of the optical imaging system. More specifically, ImgH may satisfy: ImgH>5.15 mm. By controlling the image height of the optical imaging system, the optical imaging system may obtain more scene details during shooting.

In an exemplary embodiment, the optical imaging system according to the present disclosure may satisfy: 1.5<f2/f7<2.0, where f2 is an effective focal length of the second lens, and f7 is an effective focal length of the seventh lens. More specifically, f2 and f7 satisfy: 1.55<f2/f7<1.90. By controlling the ratio of the effective focal length of the second lens to the effective focal length of the seventh lens, the deflection angle of the light in the optical imaging system may be reduced, thereby improving the image quality of the optical imaging system.

In an exemplary embodiment, the optical imaging system according to the present disclosure may satisfy: 2.0<f3/f<3.0, where f is a total effective focal length of the optical imaging system, and f3 is an effective focal length of the third lens. More specifically, f and f3 may satisfy: 2.15<f3/f<2.65. By constraining the effective focal length of the third lens, it is beneficial to make the third lens produce positive astigmatic. The positive astigmatic can offset the negative astigmatic generated in the object side of the third lens, thereby enabling the optical imaging system to have good imaging quality.

In an exemplary embodiment, the optical imaging system according to the present disclosure may satisfy: 1.1<f6/f1<2.0, where f1 is an effective focal length of the first lens, and f6 is an effective focal length of the sixth lens. More specifically, f1 and f6 may satisfy: 1.13<f6/f1<1.73. By reasonably configuring the effective focal length of the first lens and the effective focal length of the sixth lens, it is beneficial to compensate the off-axis aberrations of the optical imaging system.

In an exemplary embodiment, the optical imaging system according to the present disclosure may satisfy: 2.5<R3/R4<4.0, where R3 is a radius of curvature of an object-side surface of the second lens, and R4 is a radius of curvature of an image-side surface of the second lens. More specifically, R3 and R4 may satisfy: 2.51<R3/R4<3.57. By controlling the ratio of the curvature radii of the surfaces on both sides of the second lens, it is beneficial to correct the Petzval field curvature of the optical imaging system.

In an exemplary embodiment, the optical imaging system according to the present disclosure may satisfy: 1.4<R6/R5<2.0, where R5 is a radius of curvature of an object-side surface of the third lens, and R6 is a radius of curvature of an image-side surface of the third lens. More specifically, R5 and R6 may satisfy: 1.47<R6/R5<1.67. By controlling the ratio of the radius of curvature of the object-side surface of the third lens to the radius of curvature of the image-side surface of the third lens, it is beneficial to make the incident angle of the light in the central field-of-view smaller at the aforementioned two surfaces, thereby reducing the tolerance sensitivity of the Modulation Transfer Function (MTF) of the central field-of-view.

In an exemplary embodiment, the optical imaging system according to the present disclosure may satisfy: 1.0<R7/R8<2.0, where R7 is a radius of curvature of an object-side surface of the fourth lens, and R8 is a radius of curvature of an image-side surface of the fourth lens. More specifically, R7 and R8 may satisfy: 1.25<R7/R8<1.95. By controlling the ratio of the radius of curvature of the object-side surface of the fourth lens to the radius of curvature of the image-side surface of the fourth lens, it is beneficial to reduce the deflection angle of the light, thereby making the optical path in the optical imaging system have better deflection.

In an exemplary embodiment, the optical imaging system according to the present disclosure may satisfy: 1.2<R12/R13<3.1, where R12 is a radius of curvature of an image-side surface of the sixth lens, and R13 is a radius of curvature of an object-side surface of the seventh lens. More specifically, R12 and R13 may satisfy: 1.28<R12/R13<3.09. By properly configuring the image-side surface of the sixth lens and the object-side surface of the seventh lens, it is beneficial to make the light in the edge field-of-view of the optical imaging system have a better incident angle, thereby effectively reducing the sensitivity of the optical imaging system.

In an exemplary embodiment, the optical imaging system according to the present disclosure may satisfy: 1.5<(R1+R9)/R10<2.5, where R1 is a radius of curvature of an object-side surface of the first lens, R9 is a radius of curvature of an object-side surface of the fifth lens, and R10 is a radius of curvature of an image-side surface of the fifth lens. More specifically, R1, R9 and R10 may satisfy: 1.54<(R1+R9)/R10<2.04. By properly configuring the object-side surface of the first lens and both object-side and image-side surfaces of the fifth lens, it is beneficial to control the bending direction and degree of bending of the first lens and the fifth lens, and may effectively control the refractive power of the first lens and the fifth lens, which is beneficial to controlling the field curvature generated by the first and the fifth lenses to improve the image quality of the optical imaging system.

In an exemplary embodiment, the optical imaging system according to the present disclosure may satisfy: 3.0<CT1/CT2<4.0, where CT1 is a center thickness of the first lens along the optical axis, and CT2 is a center thickness of the second lens along the optical axis. More specifically, CT1 and CT2 may satisfy: 3.05<CT1/CT2<3.85. By controlling the ratio of the center thickness of the first lens to the center thickness of the second lens, it is beneficial to make the first lens and the second lens have better processing manufacturability, so that the first lens and the second lens may be easily molded. Further, it is beneficial to correct the off-axis coma of the optical imaging system.

In an exemplary embodiment, the optical imaging system according to the present disclosure may satisfy: 1.5<CT4/CT3<3.5, where CT4 is a center thickness of the fourth lens along the optical axis, and CT3 is a center thickness of the third lens along the optical axis. More specifically, CT4 and CT3 may satisfy: 1.6<CT4/CT3<3.3. By controlling the ratio of the center thickness of the fourth lens to the center thickness of the third lens, it is beneficial to shorten the total optical length of the optical imaging system, so that the optical imaging system has ultra-thin characteristics. In addition, the astigmatic of the off-axis field of the optical imaging system in the tangential and sagittal directions may be corrected.

In an exemplary embodiment, the optical imaging system according to the present disclosure may satisfy: 1.3<CT6/CT7≤2.8, where CT6 is a center thickness of the sixth lens along the optical axis, and CT7 is a center thickness of the seventh lens along the optical axis. By controlling the ratio of the center thickness of the sixth lens to the center thickness of the seventh lens, it is beneficial to control the distortion of the optical imaging system, and then control the distortion of the optical imaging system within a desired range.

In an exemplary embodiment, the optical imaging system according to the present disclosure may satisfy: 1.5<T67/T56<3.6, where T56 is a spaced interval between the fifth lens and the sixth lens along the optical axis, and T67 is a spaced interval between the sixth lens and the seventh lens along the optical axis. More specifically, T56 and T67 may satisfy: 1.62<T67/T56<3.52. By properly configuring the air intervals between the fifth lens and the seventh lens, it is beneficial to control the field curvature of the optical imaging system, so that the off-axis field of the optical imaging system has good image quality.

In an exemplary embodiment, the optical imaging system according to the present disclosure may satisfy: 0.5<T34/T45<1.5, where T34 is a spaced interval between the third lens and the fourth lens along the optical axis, and T45 is a spaced interval between the fourth lens and the fifth lens along the optical axis. More specifically, T34 and T45 may satisfy: 0.9<T34/T45<1.3. By controlling the air intervals between the third lens and the fifth lens, it is beneficial to control the field curvature contribution in each field-of-view to be within a desired range.

In an exemplary embodiment, the optical imaging system according to the present disclosure may satisfy: n2>1.6, n3>1.6, and n5>1.6, where n2 is a refractive index of the second lens, n3 is a refractive index of the third lens, and n5 is a refractive index of the fifth lens. By employing high refractive index material, the second lens, the third lens, and the fifth lens may have a higher refractive index. The second lens and the third lens with high refractive index are beneficial to correcting the on-axis spherical aberrations of the optical imaging system, thereby improving the image quality of the center field-of-view. The fifth lens with high refractive index is beneficial to correcting the off-axis coma of the optical imaging system, thereby improving the image quality of the off-axis field-of-view.

The optical imaging system according to the above embodiments of the present disclosure may employ a plurality of lenses, such as seven lenses as described above. By properly configuring the refractive power of each lens, the surface shape, the center thickness of each lens, and spaced intervals along the optical axis between the lenses, the size and the sensitivity of the imaging system may be effectively reduced, and the workability of the imaging system may be improved, such that the optical imaging system is more advantageous for production processing and may be applied to portable electronic products. At the same time, the optical imaging system of the present disclosure also has excellent optical performances such as high image quality and large image plane.

In the embodiments of the present disclosure, at least one of the surfaces of lenses is aspheric, that is, at least one of the object-side surface of the first lens to the image-side surface of the seventh lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, at least one of the object-side surface and the image-side surface of each of the first lens, the second lens, the third lens, the fourth lens, the fifth lens, the sixth lens and the seventh lens is aspheric. Optionally, the object-side surface and the image-side surface of each of the first lens, the second lens, the third lens, the fourth lens, the fifth lens, the sixth lens and the seventh lens are aspheric.

However, it will be understood by those skilled in the art that the number of lenses constituting the optical imaging system may be varied to achieve the various results and advantages described in this specification without departing from the technical solution claimed by the present disclosure. For example, although the embodiment is described by taking seven lenses as an example, the optical imaging system is not limited to include seven lenses. The optical imaging system may also include other numbers of lenses if desired.

Some specific examples of an optical imaging system applicable to the above embodiment will be further described below with reference to the accompanying drawings.

Example 1

An optical imaging system according to example 1 of the present disclosure is described below with reference to FIG. 1 to FIG. 2D. FIG. 1 shows a schematic structural view of the optical imaging system according to example 1 of the present disclosure.

As shown in FIG. 1, the optical imaging system includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. The optical imaging system has an imaging plane S17, and light from an object sequentially passes through the respective surfaces S1 to S16 and is finally imaged on the imaging plane S17.

Table 1 is a table illustrating basic parameters of the optical imaging system of example 1, wherein the units for the radius of curvature, the thickness/distance and the focal length are millimeter (mm).

TABLE 1

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.5000 | | | | |
| S1 | Aspheric | 2.2392 | 0.8472 | 1.55 | 56.1 | 4.87 | −0.0107 |
| S2 | Aspheric | 12.2793 | 0.0254 | | | | −11.9136 |
| S3 | Aspheric | 6.7018 | 0.2459 | 1.67 | 20.4 | −6.78 | 4.4843 |
| S4 | Aspheric | 2.6601 | 0.0941 | | | | 0.9241 |
| S5 | Aspheric | 3.5225 | 0.3230 | 1.65 | 23.5 | 15.56 | 2.1100 |
| S6 | Aspheric | 5.2348 | 0.4951 | | | | 3.5549 |
| S7 | Aspheric | −17.5603 | 0.5310 | 1.55 | 56.1 | 50.28 | 0.5026 |
| S8 | Aspheric | −10.8229 | 0.4783 | | | | −51.9242 |
| S9 | Aspheric | 5.0099 | 0.3399 | 1.67 | 20.4 | −51.25 | −2.9063 |
| S10 | Aspheric | 4.2510 | 0.4543 | | | | −1.0038 |
| S11 | Aspheric | 13.6220 | 0.6767 | 1.55 | 56.1 | 5.60 | −12.2809 |
| S12 | Aspheric | −3.8763 | 0.9304 | | | | −0.1701 |
| S13 | Aspheric | −2.4326 | 0.5183 | 1.54 | 55.6 | −3.59 | −0.9203 |
| S14 | Aspheric | 9.9712 | 0.0668 | | | | 2.0743 |
| S15 | Spherical | Infinite | 0.2366 | 1.52 | 64.2 | | |
| S16 | Spherical | Infinite | 0.5639 | | | | |
| S17 | Spherical | Infinite | | | | | |

In example 1, a total effective focal length f of the optical imaging system is 5.89 mm, an on-axis distance TTL from the object-side surface S1 of the first lens E1 to the imaging plane S17 is 6.83 mm, half of a diagonal length ImgH of an effective pixel area on the imaging plane S17 is 5.20 mm, half of a maximal field-of-view Semi-FOV is 40.96°, and an aperture value Fno of the optical imaging system is 1.92.

In example 1, the object-side surface and the image-side surface of any one of the first lens E1 to the seventh lens E7 are aspheric. The surface shape x of each aspheric lens may be defined by using, but not limited to, the following aspheric formula:

$$x = \frac{ch^2}{1+\sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1 to S14 in example 1.

TABLE 2

| Surface number | A4 | A6 | A8 | A10 | A12 | A14 | A16 | A18 | A20 |
|---|---|---|---|---|---|---|---|---|---|
| S1 | −1.7129E−04 | −3.5790E−03 | −1.7510E−03 | −6.2293E−04 | −1.8084E−04 | −3.3514E−05 | −7.2523E−07 | 3.4216E−06 | 4.1990E−07 |
| S2 | −1.9169E−02 | −1.5046E−03 | 7.9510E−04 | −4.7427E−04 | 2.2595E−04 | −2.1382E−05 | −2.3760E−05 | 1.0290E−06 | −2.2588E−06 |
| S3 | −4.6317E−02 | 1.0162E−02 | 2.7333E−03 | 4.6343E−04 | 3.0766E−04 | −8.4092E−05 | −9.2389E−05 | −5.6617E−06 | −9.1700E−06 |
| S4 | −6.7292E−02 | 6.5881E−03 | −3.5281E−04 | 1.7263E−03 | 7.3433E−04 | 2.6411E−04 | −5.2190E−05 | −1.7488E−05 | −1.1628E−05 |
| S5 | −4.6576E−02 | 1.7516E−02 | −2.6746E−03 | −1.3829E−03 | −5.0475E−04 | 2.9239E−05 | −3.9202E−06 | 3.2602E−05 | 1.2123E−05 |
| S6 | −3.8472E−04 | 1.0229E−02 | 2.2965E−03 | 5.4407E−04 | 8.0085E−05 | 7.1563E−06 | −5.3283E−06 | −5.0606E−06 | −1.4985E−06 |
| S7 | −1.9904E−01 | −3.3028E−03 | 1.1537E−02 | 8.0217E−03 | 3.9286E−03 | 1.6525E−03 | 5.8784E−04 | 1.7517E−04 | 3.9112E−05 |
| S8 | −4.0777E−01 | −1.2650E−02 | 4.6636E−03 | 3.9986E−03 | 7.6216E−04 | 4.0398E−06 | −2.2994E−04 | −1.3686E−04 | −4.7039E−05 |
| S9 | −1.2439E+00 | 5.1106E−02 | 6.1050E−03 | 1.0577E−02 | −3.3061E−03 | 9.7613E−04 | 7.7305E−04 | −1.3463E−04 | −7.4892E−05 |
| S10 | −1.5651E+00 | 1.9271E−01 | −3.6277E−02 | −3.1992E−03 | −1.0470E−03 | 1.0770E−02 | 7.5100E−03 | 2.2161E−03 | 5.7640E−04 |
| S11 | −1.0561E+00 | 4.2237E−02 | 4.7003E−02 | −1.0375E−02 | 5.8837E−03 | 1.2592E−03 | 1.3886E−03 | 1.2733E−03 | 4.2886E−04 |
| S12 | 2.2374E−01 | 4.7474E−02 | 4.2179E−02 | −2.6998E−02 | 3.2353E−02 | 7.5152E−03 | −1.5721E−04 | 1.3250E−03 | 4.5931E−04 |

TABLE 2-continued

| Surface number | A4 | A6 | A8 | A10 | A12 | A14 | A16 | A18 | A20 |
|---|---|---|---|---|---|---|---|---|---|
| S13 | 1.6883E+00 | 1.3663E−01 | −1.0253E−01 | 7.2127E−03 | 2.4299E−02 | −1.8539E−02 | 7.0725E−03 | −1.5098E−03 | 1.4255E−04 |
| S14 | −2.7572E+00 | 3.4780E−01 | 3.9864E−03 | 1.5093E−02 | −1.8126E−02 | −1.4772E−02 | 3.3427E−03 | −5.6782E−04 | 2.2282E−03 |

Figure 2A:
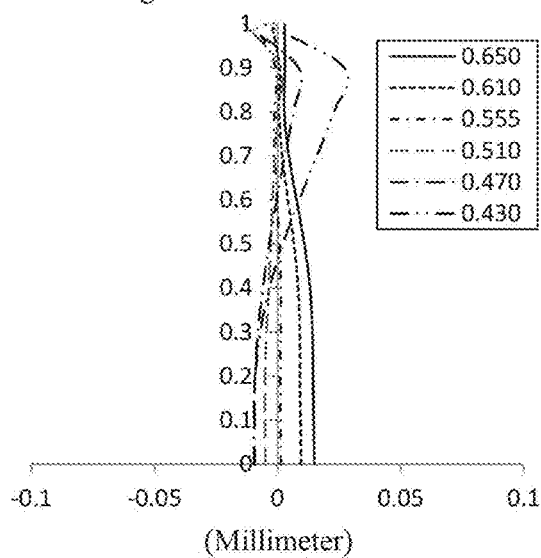
Figure 2B:
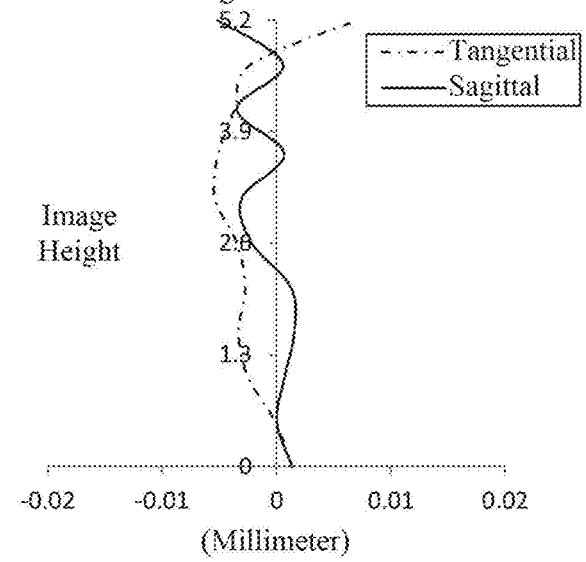

FIG. 2A illustrates a longitudinal aberration curve of the optical imaging system according to example 1, representing deviations of focal points converged by light of different wavelengths after passing through the system. FIG. 2B illustrates an astigmatic curve of the optical imaging system according to example 1, representing a curvature of a tangential plane and a curvature of a sagittal plane. FIG. 2C illustrates a distortion curve of the optical imaging system according to example 1, representing amounts of distortion corresponding to different image heights. FIG. 2D illustrates a lateral color curve of the optical imaging system according to example 1, representing deviations of different image heights on an imaging plane after light passes through the system. It can be seen from FIG. 2A to FIG. 2D that the optical imaging system provided in example 1 may achieve good image quality.

Example 2

An optical imaging system according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the optical imaging system according to example 2 of the present disclosure.

As shown in FIG. 3, the optical imaging system includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has positive refractive power, an object-side surface S9 thereof is a convex surface, and an image-side surface S10 thereof is a concave surface. The sixth lens E6 has positive refractive power, an object-side surface S11 thereof is a concave surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface 516. The optical imaging system has an imaging plane 517, and light from an object sequentially passes through the respective surfaces S1 to S16 and is finally imaged on the imaging plane S17.

In example 2, a total effective focal length f of the optical imaging system is 6.10 mm, an on-axis distance TTL from the object-side surface S1 of the first lens E1 to the imaging plane S17 is 7.26 mm, half of a diagonal length ImgH of an effective pixel area on the imaging plane S17 is 5.40 mm, half of a maximal field-of-view Semi-FOV is 41.03°, and an aperture value Fno of the optical imaging system is 1.92.

Table 3 is a table illustrating basic parameters of the optical imaging system of example 2, wherein the units for the radius of curvature, the thickness/distance and the focal length are millimeter (mm). Table 4 shows high-order coefficients applicable to each aspheric surface in example 2, wherein the surface shape of each aspheric surface may be defined by the formula (1) given in the above example 1.

TABLE 3

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −0.5000 | | | | |
| S1 | Aspheric | 2.4086 | 0.7975 | 1.55 | 56.1 | 4.97 | −0.0113 |
| S2 | Aspheric | 19.0522 | 0.1058 | | | | −0.1803 |
| S3 | Aspheric | 8.2992 | 0.2300 | 1.67 | 20.4 | −6.28 | 4.7502 |
| S4 | Aspheric | 2.7537 | 0.0800 | | | | 0.9790 |
| S5 | Aspheric | 3.6056 | 0.3781 | 1.65 | 23.5 | 13.78 | 2.2674 |
| S6 | Aspheric | 5.8195 | 0.4730 | | | | 2.6434 |
| S7 | Aspheric | −12.4562 | 0.8719 | 1.55 | 56.1 | 36.25 | −24.4532 |
| S8 | Aspheric | −7.8333 | 0.4492 | | | | −39.7068 |
| S9 | Aspheric | 3.8159 | 0.2484 | 1.67 | 20.4 | 90.00 | −1.9779 |
| S10 | Aspheric | 3.9688 | 0.5239 | | | | −1.2250 |
| S11 | Aspheric | −196.0300 | 0.7791 | 1.55 | 56.1 | 7.40 | −99.0000 |
| S12 | Aspheric | −3.9650 | 0.9825 | | | | −0.2624 |
| S13 | Aspheric | −2.7014 | 0.4796 | 1.54 | 55.6 | −3.71 | −0.9318 |
| S14 | Aspheric | 8.0597 | 0.1154 | | | | 0.9579 |
| S15 | Spherical | Infinite | 0.2457 | 1.52 | 64.2 | | |
| S16 | Spherical | Infinite | 0.5012 | | | | |
| S17 | Spherical | Infinite | | | | | |

TABLE 4

| Surface number | A4 | A6 | A8 | A10 | A12 | A14 | A16 | A18 | A20 |
|---|---|---|---|---|---|---|---|---|---|
| S1 | 4.4931E−05 | −4.5359E−03 | −2.2678E−03 | −8.5613E−04 | −2.7731E−04 | −7.4964E−05 | −1.6760E−05 | −3.0059E−06 | −9.6881E−07 |
| S2 | −1.8544E−02 | −2.7415E−03 | −6.3032E−04 | −3.7118E−04 | 4.0219E−05 | −1.5617E−05 | −1.3970E−06 | −5.0787E−06 | −2.5828E−06 |
| S3 | −4.7687E−02 | 1.1968E−02 | 1.6062E−03 | 5.0192E−04 | 2.0517E−04 | −7.2923E−05 | −6.2213E−05 | −2.9283E−05 | −8.6529E−06 |
| S4 | −6.7951E−02 | 9.8391E−03 | 3.5577E−04 | 1.1823E−03 | 6.5089E−04 | 2.9034E−04 | 9.3943E−06 | −3.3717E−05 | −1.7216E−05 |
| S5 | −4.1593E−02 | 1.2719E−02 | −3.7809E−03 | −1.1398E−03 | 2.6133E−04 | 4.2253E−04 | −7.1380E−05 | −1.2997E−04 | −4.5700E−05 |
| S6 | −3.0798E−03 | 9.1338E−03 | 1.7118E−03 | 4.6273E−04 | 4.0464E−05 | 1.4114E−06 | −3.9223E−06 | −1.3218E−06 | −1.9046E−06 |
| S7 | −1.9903E−01 | 1.1087E−04 | 1.1212E−02 | 7.8036E−03 | 3.9672E−03 | 1.7614E−03 | 6.6069E−04 | 2.0064E−04 | 4.0119E−05 |
| S8 | −4.0944E−01 | 2.1212E−03 | −7.3091E−04 | 1.3224E−03 | 9.3043E−05 | 7.6394E−05 | −1.8092E−05 | −1.1714E−05 | −9.7716E−06 |
| S9 | −1.2569E+00 | 7.1731E−02 | 1.7246E−03 | 2.9626E−03 | 1.6296E−03 | 2.5233E−03 | 1.7549E−03 | 3.0739E−04 | 4.5340E−05 |
| S10 | −1.6500E+00 | 1.9480E−01 | −2.2613E−02 | −1.5361E−02 | 1.4435E−03 | 8.7880E−03 | 7.8568E−03 | 2.5328E−03 | 7.6853E−04 |
| S11 | −9.9336E−01 | 4.3680E−02 | 5.6468E−02 | −5.1385E−04 | 7.4142E−03 | 6.2688E−04 | 9.3269E−04 | 1.4475E−03 | 5.1221E−04 |
| S12 | 2.7458E−01 | 6.9445E−02 | 1.5368E−02 | −2.7351E−02 | 2.7792E−02 | 5.6137E−03 | −3.6535E−04 | 1.3639E−03 | 6.2297E−04 |
| S13 | 1.7663E+00 | 1.4003E−01 | −1.0776E−01 | 7.3239E−03 | 2.5333E−02 | −1.9197E−02 | 7.3564E−03 | −1.5709E−03 | 1.4546E−04 |
| S14 | −2.8605E+00 | 4.0650E−01 | −2.7833E−02 | 1.7590E−02 | −1.5596E−02 | −1.0761E−02 | 3.1066E−03 | −1.8645E−03 | 1.1098E−03 |

Figure 4A:
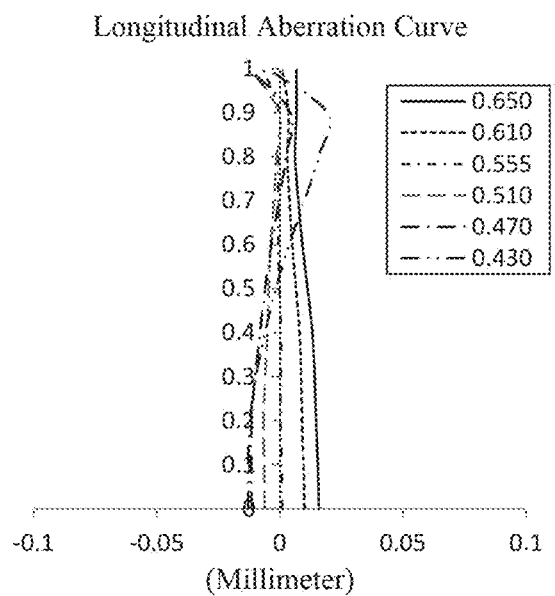
FIGS. 4A to 4D illustrate a longitudinal aberration curve, an astigmatic curve, a distortion curve, and a lateral color curve of the optical imaging system of the example 2, respectively.
Figure 4B:
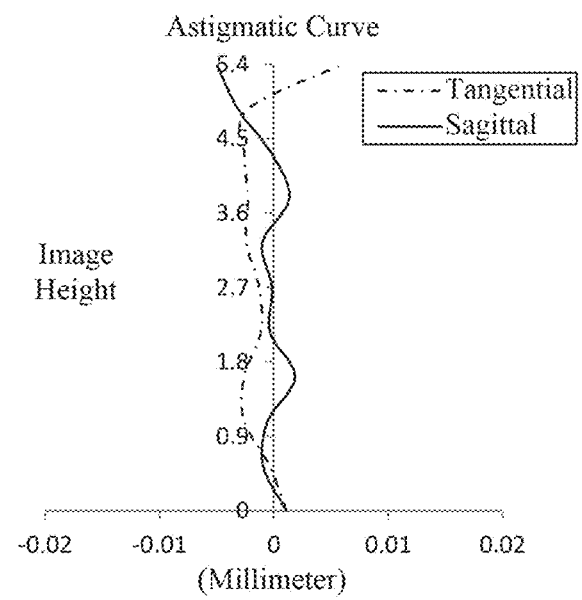
Figure 4C:
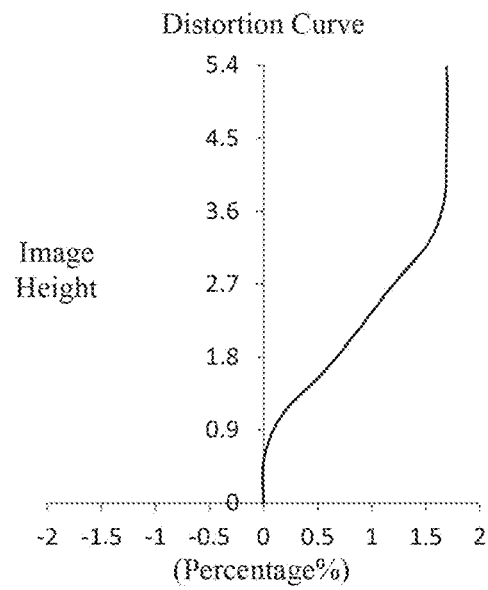
Figure 4D:
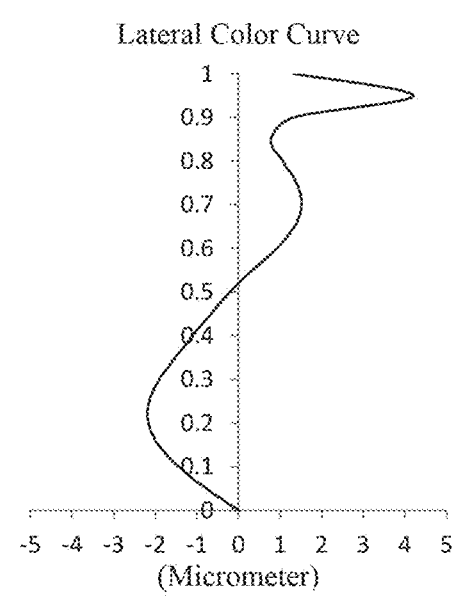

FIG. 4A illustrates a longitudinal aberration curve of the optical imaging system according to example 2, representing deviations of focal points converged by light of different wavelengths after passing through the system. FIG. 4B illustrates an astigmatic curve of the optical imaging system according to example 2, representing a curvature of a tangential plane and a curvature of a sagittal plane. FIG. 4C illustrates a distortion curve of the optical imaging system according to example 2, representing amounts of distortion corresponding to different image heights. FIG. 4D illustrates a lateral color curve of the optical imaging system according to example 2, representing deviations of different image heights on an imaging plane after light passes through the system. It can be seen from FIG. 4A to FIG. 4D that the optical imaging system provided in example 2 may achieve good image quality.

Example 3

An optical imaging system according to example 3 of the present disclosure is described below with reference to FIG. 5 to FIG. 6D. FIG. 5 shows a schematic structural view of the optical imaging system according to example 3 of the present disclosure.

As shown in FIG. 5, the optical imaging system includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has positive refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface 516. The optical imaging system has an imaging plane 517, and light from an object sequentially passes through the respective surfaces S1 to S16 and is finally imaged on the imaging plane S17.

In example 3, a total effective focal length f of the optical imaging system is 6.43 mm, an on-axis distance TTL from the object-side surface S1 of the first lens E1 to the imaging plane S17 is 7.64 mm, half of a diagonal length ImgH of an effective pixel area on the imaging plane S17 is 5.60 mm, half of a maximal field-of-view Semi-FOV is 40.59°, and an aperture value Fno of the optical imaging system is 1.92.

Table 5 is a table illustrating basic parameters of the optical imaging system of example 3, wherein the units for the radius of curvature, the thickness/distance and the focal length are millimeter (mm). Table 6 shows high-order coefficients applicable to each aspheric surface in example 3, wherein the surface shape of each aspheric surface may be defined by the formula (1) given in the above example 1.

TABLE 5

| | | | | Material | | | |
|---|---|---|---|---|---|---|---|
| Surface number | Surface type | Radius of curvature | Thickness/ Distance | Refractive index | Abbe number | Focal length | Conic coefficient |
| OBJ | Spherical | Infinite | Infinite | | | | |
| STO | Spherical | Infinite | −0.5000 | | | | |
| S1 | Aspheric | 2.5197 | 0.8453 | 1.55 | 56.1 | 5.17 | −0.0019 |
| S2 | Aspheric | 20.6939 | 0.1255 | | | | 8.1784 |
| S3 | Aspheric | 8.9755 | 0.2300 | 1.67 | 20.4 | −6.44 | 4.1712 |
| S4 | Aspheric | 2.8750 | 0.0835 | | | | 0.9929 |

TABLE 5-continued

| Surface number | Surface type | Radius of curvature | Thickness/ Distance | Material Refractive index | Abbe number | Focal length | Conic coefficient |
|---|---|---|---|---|---|---|---|
| S5 | Aspheric | 3.7593 | 0.4009 | 1.65 | 23.5 | 13.90 | 2.2978 |
| S6 | Aspheric | 6.2053 | 0.4820 | | | | 2.3063 |
| S7 | Aspheric | −12.1586 | 0.9755 | 1.55 | 56.1 | 39.66 | −28.0702 |
| S8 | Aspheric | −8.0063 | 0.4092 | | | | −44.1734 |
| S9 | Aspheric | 4.0357 | 0.2490 | 1.67 | 20.4 | 90.00 | −1.9513 |
| S10 | Aspheric | 4.2198 | 0.6111 | | | | −1.1529 |
| S11 | Aspheric | 70.0000 | 0.8179 | 1.55 | 56.1 | 7.82 | −99.0000 |
| S12 | Aspheric | −4.5259 | 0.9955 | | | | −0.1789 |
| S13 | Aspheric | −2.8535 | 0.4864 | 1.54 | 55.6 | −3.89 | −0.9318 |
| S14 | Aspheric | 8.2853 | 0.1379 | | | | 1.1532 |
| S15 | Spherical | Infinite | 0.2548 | 1.52 | 64.2 | | |
| S16 | Spherical | Infinite | 0.5380 | | | | |
| S17 | Spherical | Infinite | | | | | |

TABLE 6

| Surface number | A4 | A6 | A8 | A10 | A12 | A14 | A16 | A18 | A20 |
|---|---|---|---|---|---|---|---|---|---|
| S1 | 1.0322E−03 | −4.0407E−03 | −2.1045E−03 | −8.0118E−04 | −2.6402E−04 | −7.3372E−05 | −1.8056E−05 | −3.7791E−06 | −1.3051E−06 |
| S2 | −1.8406E−02 | −2.5879E−03 | −7.1661E−04 | −3.2493E−04 | 1.9286E−05 | −1.2187E−05 | −3.2774E−07 | −3.2136E−06 | −8.4421E−07 |
| S3 | −5.0317E−02 | 1.2357E−02 | 1.3232E−03 | 5.8115E−04 | 2.2496E−04 | −1.3049E−05 | −2.5186E−05 | −1.2446E−05 | −3.2037E−06 |
| S4 | −6.9537E−02 | 1.0146E−02 | 4.0164E−04 | 1.2477E−03 | 7.3059E−04 | 3.6419E−04 | 6.6229E−05 | −8.2291E−06 | −8.7505E−06 |
| S5 | −4.1248E−02 | 1.0749E−02 | −4.1481E−03 | −1.0681E−03 | 5.6982E−04 | 6.2567E−04 | 3.7289E−05 | −9.1353E−05 | −3.6304E−05 |
| S6 | −3.6610E−03 | 8.8703E−03 | 1.6517E−03 | 4.1583E−04 | 3.2719E−05 | 6.3169E−07 | −2.1838E−06 | −5.1554E−07 | −1.6409E−06 |
| S7 | −2.0491E−01 | 2.6400E−04 | 1.1032E−02 | 7.4212E−03 | 3.7342E−03 | 1.6598E−03 | 6.3076E−04 | 1.9426E−04 | 3.9216E−05 |
| S8 | −4.1499E−01 | 6.5559E−03 | −1.3281E−03 | 1.1761E−03 | −7.6463E−05 | 4.4389E−05 | −2.5067E−05 | −7.9488E−06 | −9.2960E−06 |
| S9 | −1.2981E+00 | 7.8202E−02 | −2.4088E−03 | 2.4688E−03 | 4.5003E−04 | 2.2159E−03 | 1.5855E−03 | 2.1124E−04 | 1.4371E−05 |
| S10 | −1.6957E+00 | 2.0445E−01 | −2.5276E−02 | −1.5057E−02 | 1.3103E−03 | 1.0008E−02 | 7.5392E−03 | 1.9520E−03 | 5.9502E−04 |
| S11 | −1.0505E+00 | 4.0336E−02 | 5.6489E−02 | −4.3201E−03 | 4.0158E−03 | 3.3841E−04 | 1.4474E−03 | 1.4578E−03 | 4.2667E−04 |
| S12 | 2.7945E−01 | 6.2434E−02 | 1.4101E−02 | −3.5446E−02 | 2.4884E−02 | 2.8124E−03 | −9.6635E−04 | 1.1030E−03 | 4.6549E−04 |
| S13 | 1.8302E+00 | 1.4415E−01 | −1.1199E−01 | 7.6633E−03 | 2.6291E−02 | −1.9906E−02 | 7.6277E−03 | −1.6292E−03 | 1.5104E−04 |
| S14 | −2.9804E+00 | 4.1376E−01 | −3.6746E−02 | 1.9357E−02 | −1.7194E−02 | −9.7732E−03 | 3.4501E−03 | −1.9923E−03 | 1.0401E−03 |

Figures 6C, 6D:
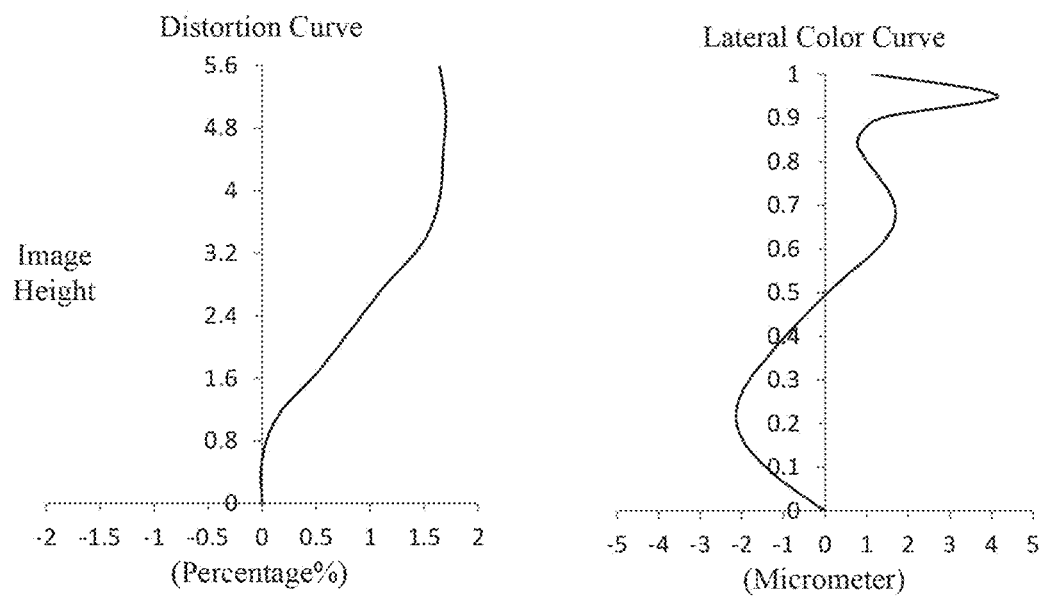

FIG. 6A illustrates a longitudinal aberration curve of the optical imaging system according to example 3, representing deviations of focal points converged by light of different wavelengths after passing through the system. FIG. 6B illustrates an astigmatic curve of the optical imaging system according to example 3, representing a curvature of a tangential plane and a curvature of a sagittal plane. FIG. 6C illustrates a distortion curve of the optical imaging system according to example 3, representing amounts of distortion corresponding to different image heights. FIG. 6D illustrates a lateral color curve of the optical imaging system according to example 3, representing deviations of different image heights on an imaging plane after light passes through the system. It can be seen from FIG. 6A to FIG. 6D that the optical imaging system provided in example 3 may achieve good image quality.

Example 4

Figure 7:
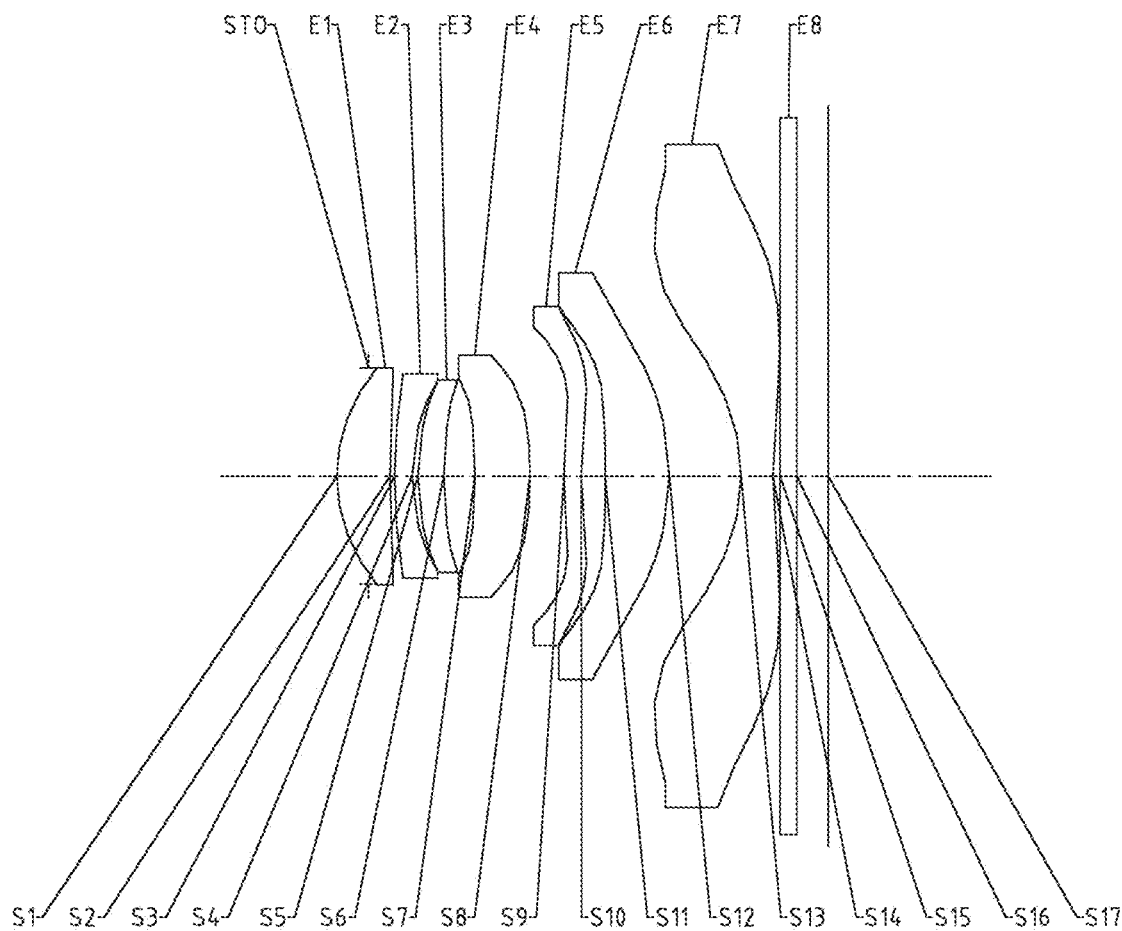
FIG. 7 illustrates a schematic structural view of an optical imaging system according to example 4 of the present disclosure.

An optical imaging system according to example 4 of the present disclosure is described below with reference to FIG. 7 to FIG. 8D. FIG. 7 shows a schematic structural view of the optical imaging system according to example 4 of the present disclosure.

As shown in FIG. 7, the optical imaging system includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a concave surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. The optical imaging system has an imaging plane S17, and light from an object sequentially passes through the respective surfaces S1 to S16 and is finally imaged on the imaging plane S17.

In example 4, a total effective focal length f of the optical imaging system is 6.42 mm, an on-axis distance TTL from the object-side surface S1 of the first lens E1 to the imaging plane S17 is 7.75 mm, half of a diagonal length ImgH of an effective pixel area on the imaging plane S17 is 5.80 mm, half of a maximal field-of-view Semi-FOV is 41.60°, and an aperture value Fno of the optical imaging system is 1.92.

Table 7 is a table illustrating basic parameters of the optical imaging system of example 4, wherein the units for the radius of curvature, the thickness/distance and the focal length are millimeter (mm). Table 8 shows high-order coefficients applicable to each aspheric surface in example 4, wherein the surface shape of each aspheric surface may be defined by the formula (1) given in the above example 1.

TABLE 7

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.5000 | | | | |
| S1 | Aspheric | 2.5805 | 0.8414 | 1.55 | 56.1 | 5.39 | −0.0063 |
| S2 | Aspheric | 18.6027 | 0.0716 | | | | −0.1279 |
| S3 | Aspheric | 8.1293 | 0.2743 | 1.67 | 20.4 | −7.00 | 4.5839 |
| S4 | Aspheric | 2.9257 | 0.0883 | | | | 0.9759 |
| S5 | Aspheric | 3.8203 | 0.4116 | 1.65 | 23.5 | 14.81 | 2.1698 |
| S6 | Aspheric | 6.1004 | 0.4904 | | | | 2.4380 |
| S7 | Aspheric | −14.8669 | 0.8706 | 1.55 | 56.1 | 29.28 | −36.1814 |
| S8 | Aspheric | −7.8612 | 0.5327 | | | | −43.3891 |
| S9 | Aspheric | 5.1020 | 0.2722 | 1.67 | 20.4 | −70.00 | −3.4868 |
| S10 | Aspheric | 4.5013 | 0.3812 | | | | −1.0278 |
| S11 | Aspheric | −90.0001 | 1.0104 | 1.55 | 56.1 | 6.96 | −99.0000 |
| S12 | Aspheric | −3.6592 | 1.1342 | | | | −0.4531 |
| S13 | Aspheric | −2.8344 | 0.4960 | 1.54 | 55.6 | −3.93 | −0.9495 |
| S14 | Aspheric | 8.7279 | 0.1181 | | | | 1.5052 |
| S15 | Spherical | Infinite | 0.2639 | 1.52 | 64.2 | | |
| S16 | Spherical | Infinite | 0.4949 | | | | |
| S17 | Spherical | Infinite | | | | | |

TABLE 8

| Surface number | A4 | A6 | A8 | A10 | A12 | A14 | A16 | A18 | A20 |
|---|---|---|---|---|---|---|---|---|---|
| S1 | 7.8403E−04 | −5.1937E−03 | −2.6493E−03 | −1.0067E−03 | −3.2688E−04 | −9.1734E−05 | −2.5690E−05 | −7.8317E−06 | −2.6942E−06 |
| S2 | −1.9846E−02 | −3.4617E−03 | −2.1689E−04 | −4.9246E−04 | 8.5469E−05 | −3.9296E−05 | −1.7809E−05 | −1.2158E−05 | −6.9699E−06 |
| S3 | −5.1552E−02 | 1.2006E−02 | 2.4698E−03 | 3.8806E−04 | 1.2471E−04 | −1.7739E−04 | −1.3093E−04 | −5.3656E−05 | −1.8952E−05 |
| S4 | −7.3363E−02 | 1.0785E−02 | 4.8113E−04 | 1.3678E−03 | 5.5752E−04 | 2.3247E−04 | −3.3253E−05 | −3.9311E−05 | −2.1946E−05 |
| S5 | −4.8294E−02 | 1.4573E−02 | −3.6451E−03 | −1.0191E−03 | 8.3786E−06 | 3.3753E−04 | −3.4174E−05 | −8.3477E−05 | −3.7865E−05 |
| S6 | −3.6602E−03 | 9.0507E−03 | 1.8622E−03 | 5.3311E−04 | 7.7934E−05 | 9.2972E−06 | −4.0742E−06 | −3.4363E−06 | −2.2168E−06 |
| S7 | −2.1448E−01 | −2.4874E−03 | 1.2580E−02 | 9.1780E−03 | 4.8223E−03 | 2.1186E−03 | 7.7325E−04 | 2.2173E−04 | 4.0966E−05 |
| S8 | −4.4631E−01 | −3.7338E−03 | 1.1088E−03 | 2.1106E−03 | 5.8038E−04 | 1.8752E−04 | 2.3029E−05 | −1.7256E−05 | −6.5311E−06 |
| S9 | −1.4014E+00 | 5.7154E−02 | 1.6516E−03 | 3.5078E−03 | 3.6484E−03 | 3.6779E−03 | 2.3397E−03 | 1.0769E−04 | 6.8825E−05 |
| S10 | −1.7527E+00 | 2.2659E−01 | −2.8172E−02 | −1.9859E−02 | 1.3064E−03 | 1.0038E−02 | 1.0971E−02 | 4.3393E−03 | 1.5120E−03 |
| S11 | −9.2691E−01 | 8.7427E−02 | 4.5053E−02 | −3.1033E−04 | 1.2271E−02 | 2.8736E−03 | 3.2574E−03 | 2.8809E−03 | 8.7300E−04 |
| S12 | 4.0785E−01 | 9.6311E−02 | −9.5988E−04 | −1.5432E−02 | 3.3673E−02 | 9.6298E−03 | 1.8321E−03 | 2.7697E−03 | 1.1491E−03 |
| S13 | 1.9365E+00 | 1.5288E−01 | −1.1572E−01 | 7.4913E−03 | 2.7137E−02 | −2.0614E−02 | 7.9085E−03 | −1.6843E−03 | 1.5668E−04 |
| S14 | −3.1642E+00 | 3.4502E−01 | −2.6527E−02 | 1.4668E−02 | −1.0328E−02 | −1.2763E−02 | 1.9154E−03 | −1.8887E−03 | 1.2326E−03 |

Figure 8A:
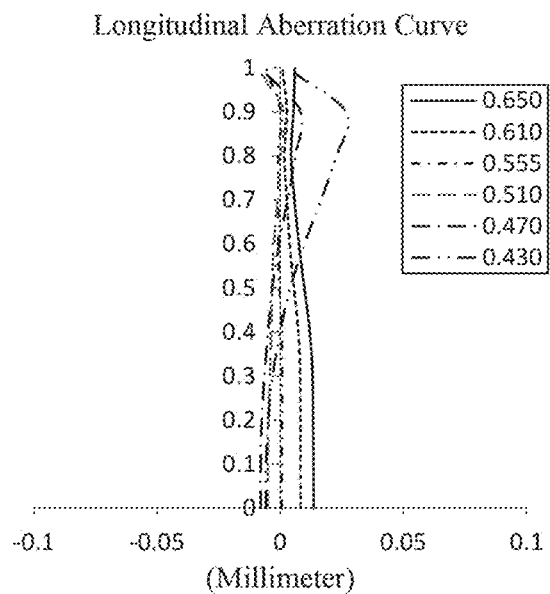
FIGS. 8A to 8D illustrate a longitudinal aberration curve, an astigmatic curve, a distortion curve, and a lateral color curve of the optical imaging system of the example 4, respectively.
Figure 8B:
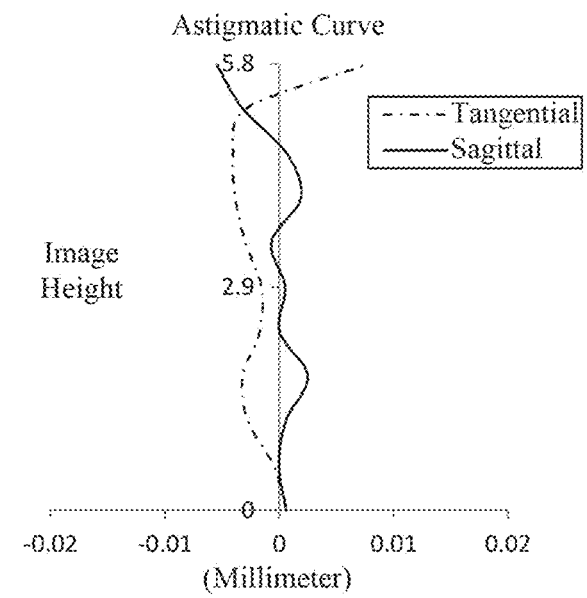
Figure 8C:
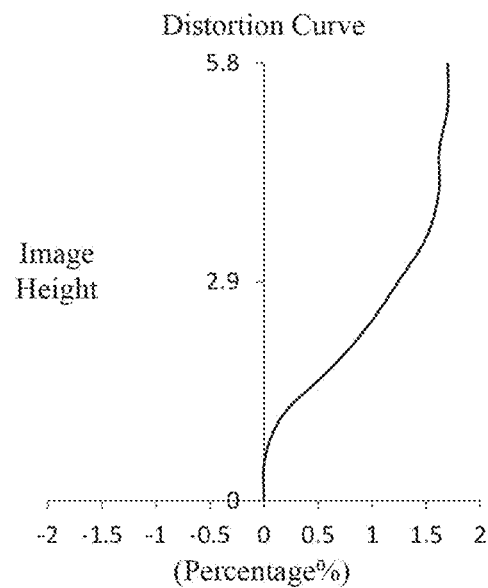
Figure 8D:
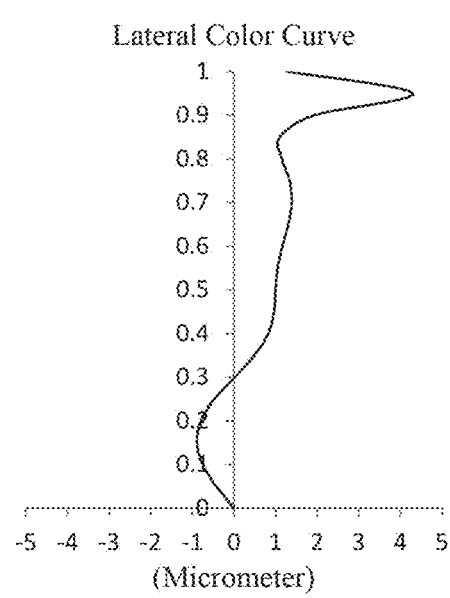

FIG. 8A illustrates a longitudinal aberration curve of the optical imaging system according to example 4, representing deviations of focal points converged by light of different wavelengths after passing through the system. FIG. 8B illustrates an astigmatic curve of the optical imaging system according to example 4, representing a curvature of a tangential plane and a curvature of a sagittal plane. FIG. 8C illustrates a distortion curve of the optical imaging system according to example 4, representing amounts of distortion corresponding to different image heights. FIG. 8D illustrates a lateral color curve of the optical imaging system according to example 4, representing deviations of different image heights on an imaging plane after light passes through the system. It can be seen from FIG. 8A to FIG. 8D that the optical imaging system provided in example 4 may achieve good image quality.

Example 5

Figure 9:
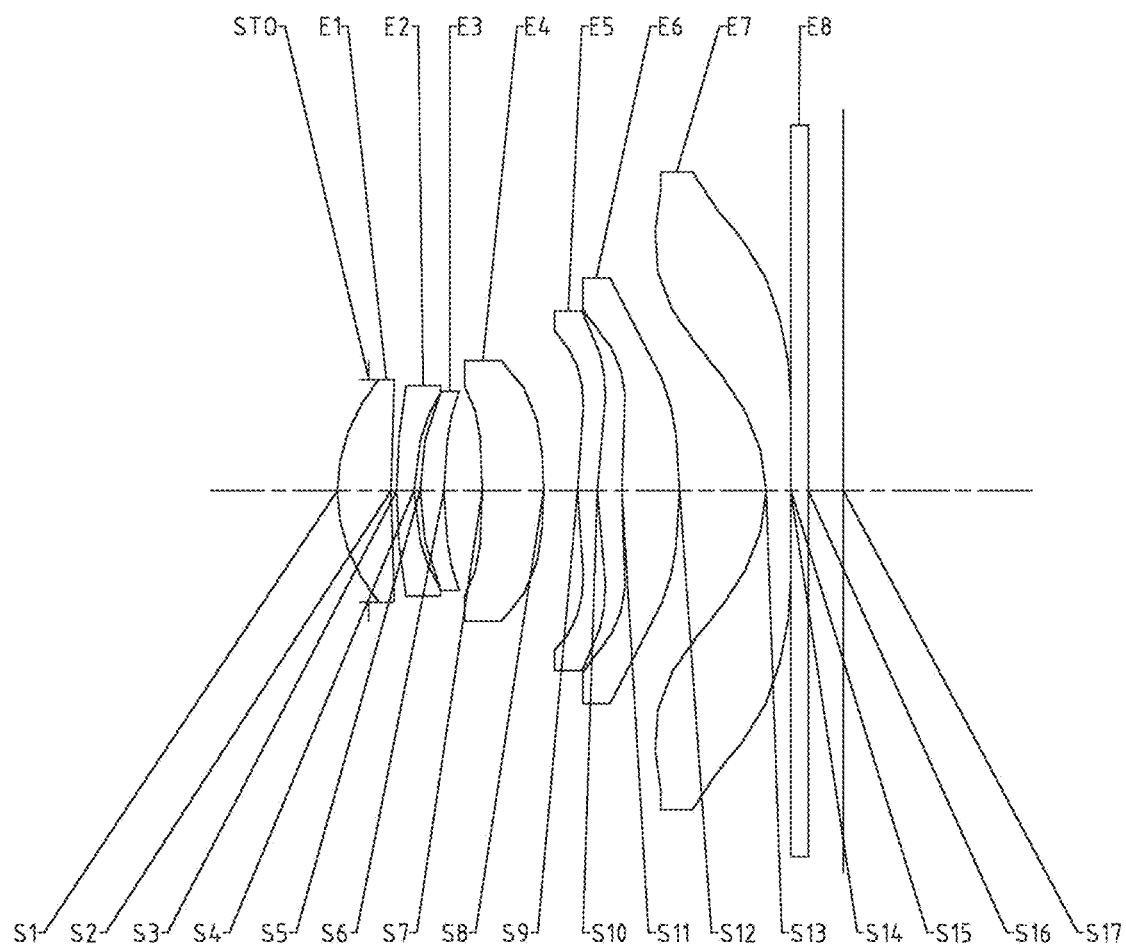
FIG. 9 illustrates a schematic structural view of an optical imaging system according to example 5 of the present disclosure.

An optical imaging system according to example 5 of the present disclosure is described below with reference to FIG. 9 to FIG. 10D. FIG. 9 shows a schematic structural view of the optical imaging system according to example 5 of the present disclosure.

As shown in FIG. 9, the optical imaging system includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is a convex surface, and an image-side surface S2 thereof is a concave surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a convex surface. The optical filter E8 has an object-side surface S15 and an image-side surface S16. The optical imaging system has an imaging plane S17, and light from an object sequentially passes through the respective surfaces S1 to S16 and is finally imaged on the imaging plane S17.

In example 5, a total effective focal length f of the optical imaging system is 6.63 mm, an on-axis distance TTL from the object-side surface S1 of the first lens E1 to the imaging plane S17 is 7.98 mm, half of a diagonal length ImgH of an effective pixel area on the imaging plane S17 is 6.00 mm, half of a maximal field-of-view Semi-FOV is 41.66, and an aperture value Fno of the optical imaging system is 1.92.

Table 9 is a table illustrating basic parameters of the optical imaging system of example 5, wherein the units for the radius of curvature, the thickness/distance and the focal length are millimeter (mm). Table 10 shows high-order coefficients applicable to each aspheric surface in example 5, wherein the surface shape of each aspheric surface may be defined by the formula (1) given in the above example 1.

TABLE 9

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.5000 | | | | |
| S1 | Aspheric | 2.6917 | 0.8464 | 1.55 | 56.1 | 5.58 | 0.0027 |
| S2 | Aspheric | 20.5796 | 0.0872 | | | | 5.5240 |
| S3 | Aspheric | 8.0010 | 0.2718 | 1.67 | 20.4 | −7.49 | 4.5484 |
| S4 | Aspheric | 3.0341 | 0.0980 | | | | 0.9604 |
| S5 | Aspheric | 3.9841 | 0.3771 | 1.65 | 23.5 | 16.98 | 2.1790 |
| S6 | Aspheric | 6.0330 | 0.6039 | | | | 2.5349 |
| S7 | Aspheric | −14.9353 | 0.9666 | 1.55 | 56.1 | 42.15 | −25.9994 |
| S8 | Aspheric | −9.2633 | 0.5379 | | | | −60.9410 |
| S9 | Aspheric | 4.7656 | 0.3089 | 1.67 | 20.4 | −27.41 | −1.3613 |
| S10 | Aspheric | 3.6824 | 0.3886 | | | | −1.4217 |
| S11 | Aspheric | 6.8731 | 0.9094 | 1.55 | 56.1 | 6.50 | −29.1513 |
| S12 | Aspheric | −6.9830 | 1.3635 | | | | 1.2830 |
| S13 | Aspheric | −2.2703 | 0.3958 | 1.54 | 55.6 | −4.30 | −0.9803 |
| S14 | Aspheric | −150.0000 | −0.0041 | | | | −99.0000 |
| S15 | Spherical | Infinite | 0.2730 | 1.52 | 64.2 | | |
| S16 | Spherical | Infinite | 0.5592 | | | | |
| S17 | Spherical | Infinite | | | | | |

TABLE 10

| Surface number | A4 | A6 | A8 | A10 | A12 | A14 | A16 | A18 | A20 |
|---|---|---|---|---|---|---|---|---|---|
| S1 | 3.8208E−03 | −4.3485E−03 | −2.1664E−03 | −7.5407E−04 | −2.1870E−04 | −4.9357E−05 | −8.6752E−06 | −5.8493E−07 | 1.0744E−07 |
| S2 | −1.7158E−02 | −3.5419E−03 | −3.4999E−04 | −3.1358E−04 | 9.0790E−05 | 4.5754E−06 | 3.3646E−06 | −6.0504E−07 | −3.5522E−06 |
| S3 | −4.9863E−02 | 9.5834E−03 | 1.2768E−03 | 3.3752E−04 | 2.2370E−04 | 4.4959E−05 | 4.5369E−06 | 3.0978E−06 | −4.1662E−06 |
| S4 | −5.6948E−02 | 7.5001E−03 | −3.9380E−04 | −3.5953E−05 | −1.3522E−04 | −3.5667E−05 | −2.7992E−05 | 3.6196E−06 | −8.7213E−07 |
| S5 | −3.6974E−02 | 5.9111E−03 | −8.7581E−05 | −1.7890E−04 | −2.9699E−04 | −1.1941E−04 | −5.6738E−05 | −6.9080E−06 | 6.3165E−07 |
| S6 | −3.6986E−04 | 1.1152E−02 | 2.6226E−03 | 7.2646E−04 | 1.0052E−04 | −8.9189E−06 | −1.3601E−05 | −2.8265E−06 | 2.4827E−06 |
| S7 | −1.8838E−01 | −9.8212E−03 | 3.3356E−03 | 2.7887E−03 | 1.4558E−03 | 6.0319E−04 | 2.1552E−04 | 6.2555E−05 | 1.1781E−05 |
| S8 | −4.9795E−01 | −3.6599E−03 | 3.3287E−03 | 3.2244E−03 | 1.3126E−03 | 5.4679E−04 | 1.5946E−04 | 3.5948E−05 | 4.3721E−06 |
| S9 | −9.9908E−01 | 3.9584E−02 | −9.7899E−03 | 2.9998E−03 | −2.8057E−03 | 2.4032E−04 | 9.6028E−05 | −8.5479E−06 | −2.0400E−05 |
| S10 | −1.3938E+00 | 1.6897E−01 | −2.1367E−02 | 9.4287E−03 | −4.2208E−03 | 8.7875E−04 | −2.4578E−04 | −7.8666E−06 | −1.2207E−05 |
| S11 | −9.7760E−01 | 3.0716E−02 | 1.4210E−02 | −5.0734E−03 | 1.6154E−03 | −2.9987E−04 | −3.4277E−04 | 1.2926E−04 | 1.9143E−04 |
| S12 | −2.6786E−01 | 1.5616E−01 | 2.5908E−04 | −3.7630E−02 | 8.8128E−03 | 3.3843E−03 | −1.2649E−03 | −3.7350E−05 | 2.7884E−04 |
| S13 | 3.4753E+00 | 4.6054E−02 | −1.9003E−01 | 5.5378E−02 | 1.5681E−02 | −3.0857E−02 | 1.7974E−02 | −6.2479E−03 | 1.2673E−03 |
| S14 | −1.6526E+00 | 1.3301E−01 | 9.0008E−02 | 8.7716E−03 | −3.1755E−03 | −2.9820E−02 | 3.6866E−03 | −2.4432E−03 | 3.1838E−03 |

Figure 10A:
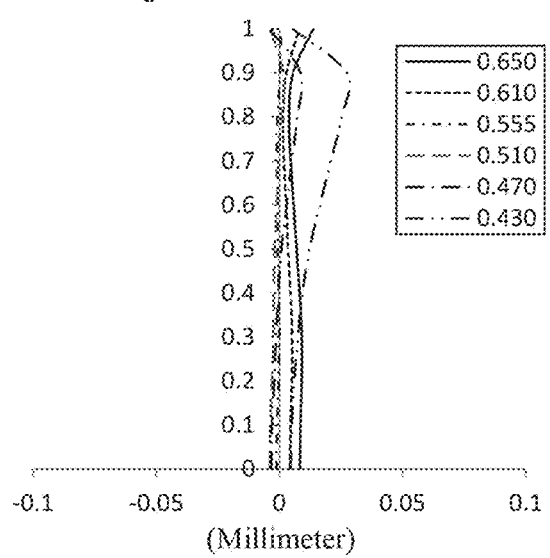
FIGS. 10A to 10D illustrate a longitudinal aberration curve, an astigmatic curve, a distortion curve, and a lateral color curve of the optical imaging system of the example 5, respectively.
Figure 10B:
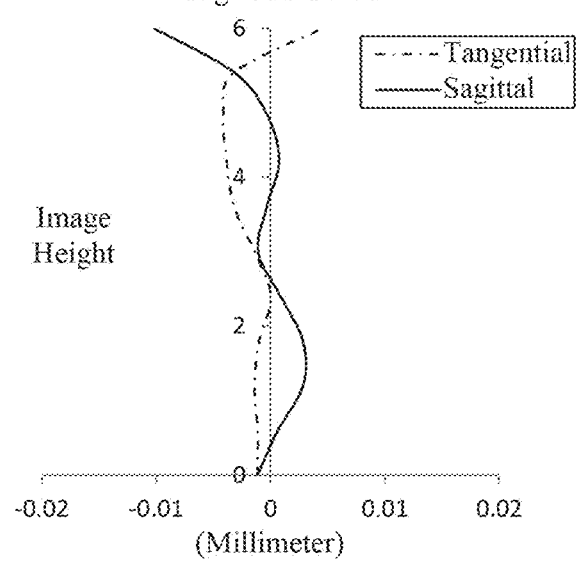
Figure 10C:
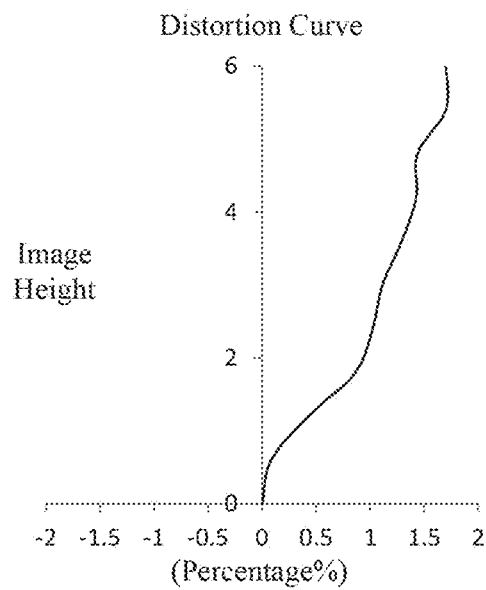
Figure 10D:
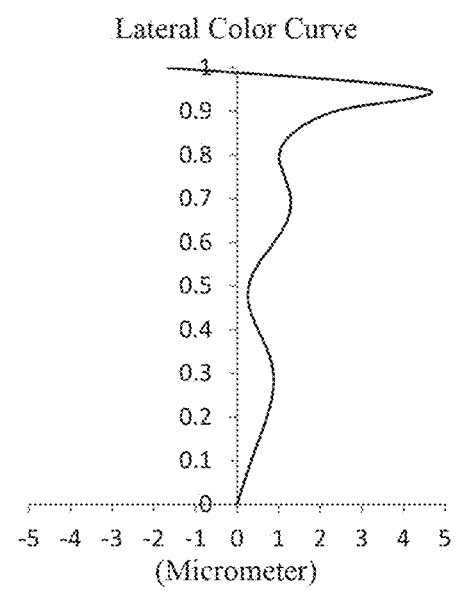

FIG. 10A illustrates a longitudinal aberration curve of the optical imaging system according to example 5, representing deviations of focal points converged by light of different wavelengths after passing through the system. FIG. 10B illustrates an astigmatic curve of the optical imaging system according to example 5, representing a curvature of a tangential plane and a curvature of a sagittal plane. FIG. 10C illustrates a distortion curve of the optical imaging system according to example 5, representing amounts of distortion corresponding to different image heights. FIG. 10D illustrates a lateral color curve of the optical imaging system according to example 5, representing deviations of different image heights on an imaging plane after light passes through the system. It can be seen from FIG. 10A to FIG. 10D that the optical imaging system provided in example 5 may achieve good image quality.

Example 6

Figure 11:
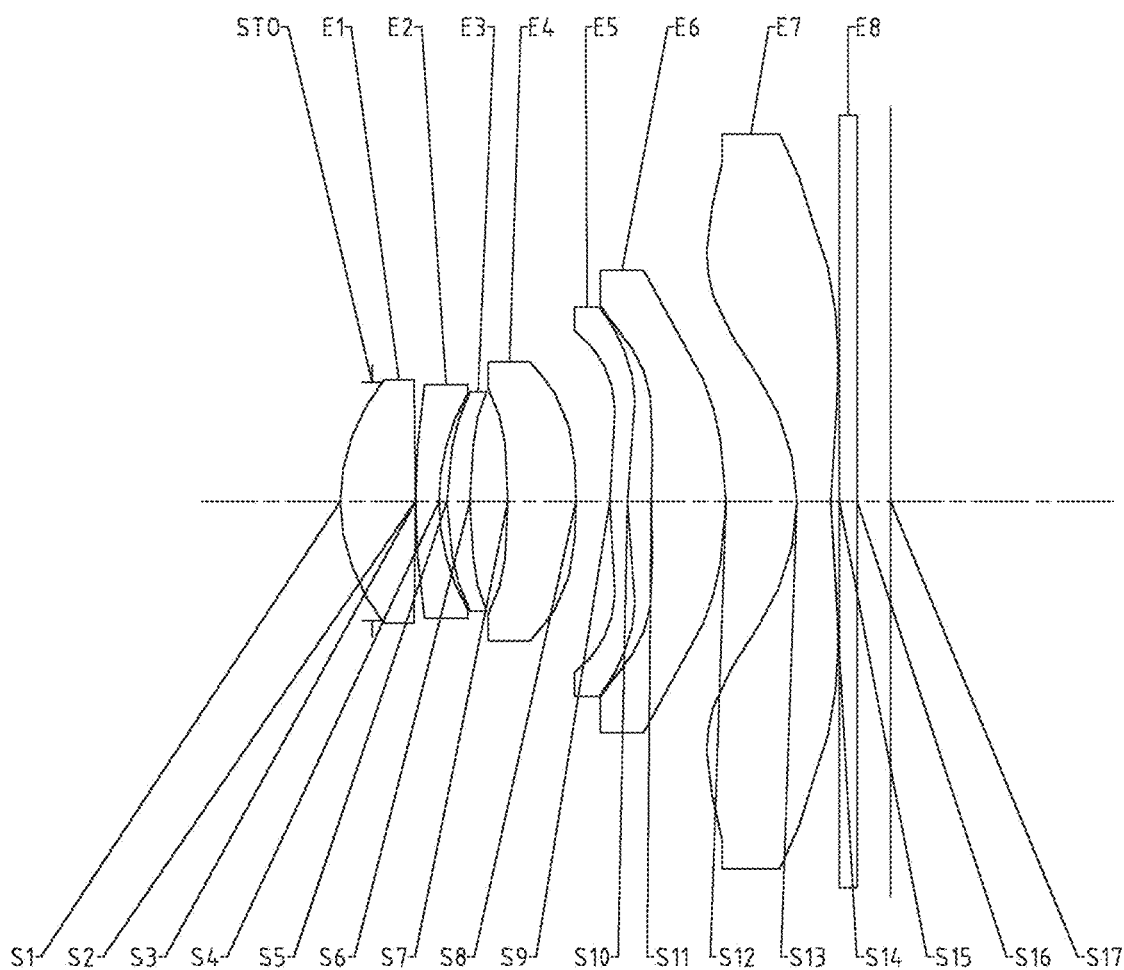
FIG. 11 illustrates a schematic structural view of an optical imaging system according to example 6 of the present disclosure.

An optical imaging system according to example 6 of the present disclosure is described below with reference to FIG. 11 to FIG. 12D. FIG. 11 shows a schematic structural view of the optical imaging system according to example 6 of the present disclosure.

As shown in FIG. 11, the optical imaging system includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is a convex surface, and an image-side surface S2 thereof is a convex surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has negative refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface S16. The optical imaging system has an imaging plane S17, and light from an object sequentially passes through the respective surfaces S1 to S16 and is finally imaged on the imaging plane S17.

In example 6, a total effective focal length f of the optical imaging system is 7.01 mm, an on-axis distance TTL from the object-side surface S1 of the first lens E1 to the imaging plane S17 is 8.62 mm, half of a diagonal length ImgH of an effective pixel area on the imaging plane S17 is 6.20 mm, half of a maximal field-of-view Semi-FOV is 40.67°, and an aperture value Fno of the optical imaging system is 1.92.

Table 11 is a table illustrating basic parameters of the optical imaging system of example 6, wherein the units for the radius of curvature, the thickness/distance and the focal length are millimeter (mm). Table 12 shows high-order coefficients applicable to each aspheric surface in example 6, wherein the surface shape of each aspheric surface may be defined by the formula (1) given in the above example 1.

TABLE 11

| Surface number | Surface type | Radius of curvature | Thickness/ Distance | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.5000 | | | | |
| S1 | Aspheric | 2.9561 | 1.1790 | 1.55 | 56.1 | 5.27 | −0.0264 |
| S2 | Aspheric | −90.0000 | 0.0200 | | | | −99.0000 |
| S3 | Aspheric | 11.3068 | 0.3526 | 1.67 | 20.4 | −6.76 | 13.0141 |
| S4 | Aspheric | 3.1846 | 0.1321 | | | | 0.8386 |
| S5 | Aspheric | 4.4840 | 0.3627 | 1.65 | 23.5 | 17.08 | 2.4461 |
| S6 | Aspheric | 7.3262 | 0.5898 | | | | 3.1473 |
| S7 | Aspheric | −13.1670 | 1.0799 | 1.55 | 56.1 | 42.29 | −32.2152 |
| S8 | Aspheric | −8.6276 | 0.5446 | | | | −53.3002 |
| S9 | Aspheric | 4.9514 | 0.2844 | 1.67 | 20.4 | −43.60 | −1.8682 |
| S10 | Aspheric | 4.1339 | 0.3730 | | | | −1.9439 |
| S11 | Aspheric | 13.7981 | 1.2358 | 1.55 | 56.1 | 7.20 | −8.2155 |
| S12 | Aspheric | −5.3168 | 1.1165 | | | | −0.0076 |
| S13 | Aspheric | −3.0925 | 0.4419 | 1.54 | 55.6 | −4.29 | −0.9527 |
| S14 | Aspheric | 9.4380 | 0.1414 | | | | 1.3642 |
| S15 | Spherical | Infinite | 0.2821 | 1.52 | 64.2 | | |
| S16 | Spherical | Infinite | 0.4844 | | | | |
| S17 | Spherical | Infinite | | | | | |

TABLE 12

| Surface number | A4 | A6 | A8 | A10 | A12 | A14 | A16 | A18 | A20 |
|---|---|---|---|---|---|---|---|---|---|
| S1 | −4.0906E−03 | −6.4887E−03 | −2.5802E−03 | −8.1611E−04 | −2.5486E−04 | −8.5959E−05 | −3.8842E−05 | −1.6035E−05 | −5.2825E−06 |
| S2 | 1.9583E−02 | −1.7115E−02 | 2.3322E−03 | −2.7196E−03 | 3.0570E−04 | −6.1209E−04 | 4.3600E−05 | −5.9810E−05 | 2.9655E−05 |
| S3 | −3.6717E−02 | 4.5300E−03 | 3.7535E−03 | −9.2683E−04 | 4.9945E−04 | −2.3478E−04 | 3.2152E−05 | −3.2721E−05 | 5.6332E−06 |
| S4 | −7.8911E−02 | 8.2250E−03 | 2.9685E−04 | 5.8567E−04 | 1.1930E−04 | 9.6362E−05 | 9.1951E−06 | 7.7869E−06 | −1.9408E−06 |
| S5 | −3.0590E−02 | 6.1653E−03 | −2.9075E−04 | 2.0652E−06 | −8.6653E−05 | 6.5263E−05 | 2.7378E−05 | 1.6849E−05 | 2.7796E−06 |
| S6 | 9.7456E−03 | 1.4846E−02 | 2.5004E−03 | 5.6225E−04 | −5.9750E−05 | −5.3786E−05 | −2.1767E−05 | −4.9430E−06 | −1.1240E−07 |
| S7 | −1.9786E−01 | −4.6196E−03 | 4.7424E−03 | 3.1077E−03 | 1.3392E−03 | 4.8761E−04 | 1.5022E−04 | 3.9888E−05 | 7.8870E−06 |
| S8 | −5.2839E−01 | 7.8586E−03 | 1.7405E−03 | 3.1162E−03 | 6.1170E−04 | 3.0547E−04 | 3.2257E−05 | 9.8307E−06 | −2.6979E−06 |
| S9 | −1.1631E+00 | 5.7578E−02 | −1.2279E−02 | 3.0004E−03 | −3.3674E−03 | −3.9169E−03 | 5.2427E−05 | −4.3436E−05 | 9.0167E−06 |
| S10 | −1.5357E+00 | 1.7530E−01 | −2.0093E−02 | 3.4753E−03 | −5.0779E−03 | 6.8772E−05 | 1.3390E−04 | −9.4737E−05 | 1.3942E−04 |
| S11 | −1.1297E+00 | 2.4061E−02 | 3.2499E−02 | 4.4550E−03 | 6.1123E−03 | 4.3843E−04 | −5.3598E−04 | −5.0965E−04 | −6.0016E−05 |
| S12 | 1.4967E−01 | 6.5817E−02 | 2.8921E−02 | −3.0324E−02 | 1.0517E−02 | 2.0410E−03 | −9.3017E−04 | −1.3418E−04 | 1.8464E−04 |
| S13 | 3.5141E+00 | −5.4997E−03 | −1.9331E−01 | 7.2025E−02 | 4.3533E−03 | −2.8977E−02 | 2.0959E−02 | −8.6630E−03 | 1.7320E−03 |
| S14 | −3.1755E+00 | 4.4835E−01 | −1.5699E−01 | −4.2796E−04 | −2.5786E−02 | −9.8740E−03 | 2.8764E−03 | −4.3038E−03 | 1.7383E−03 |

Figure 12A:
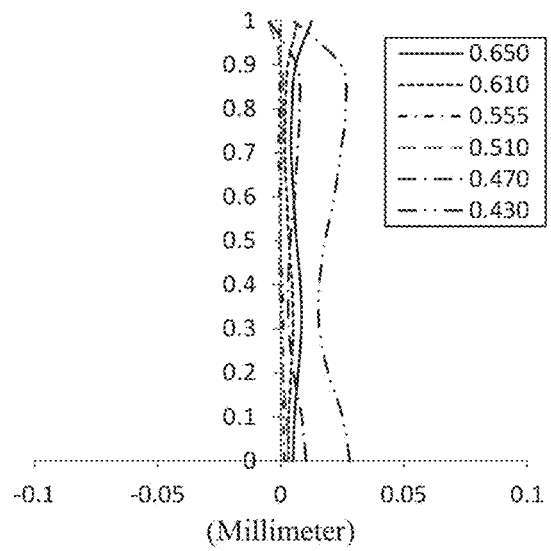
FIGS. 12A to 12D illustrate a longitudinal aberration curve, an astigmatic curve, a distortion curve, and a lateral color curve of the optical imaging system of the example 6, respectively.
Figure 12B:
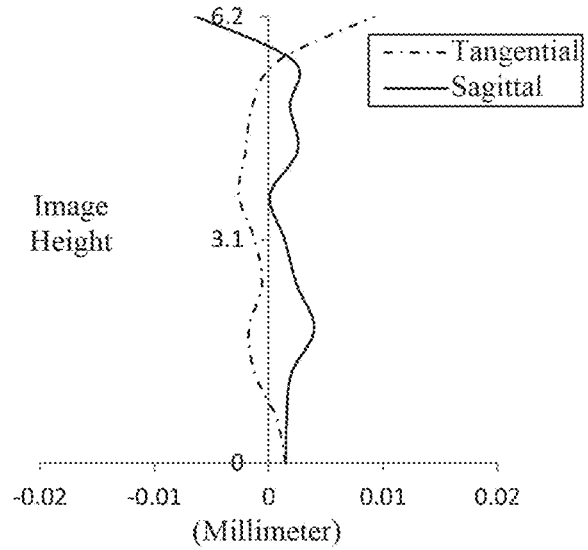
Figure 12C:
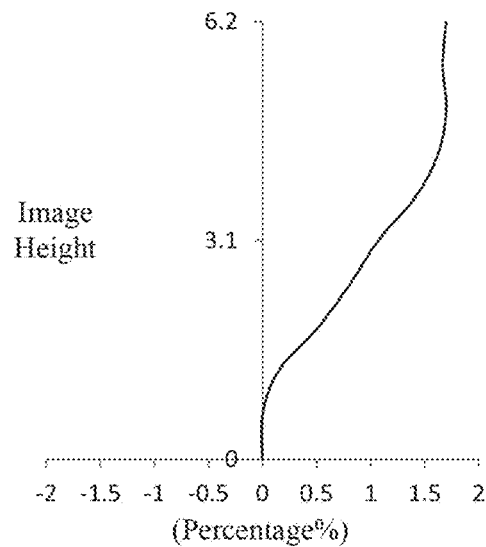
Figure 12D:
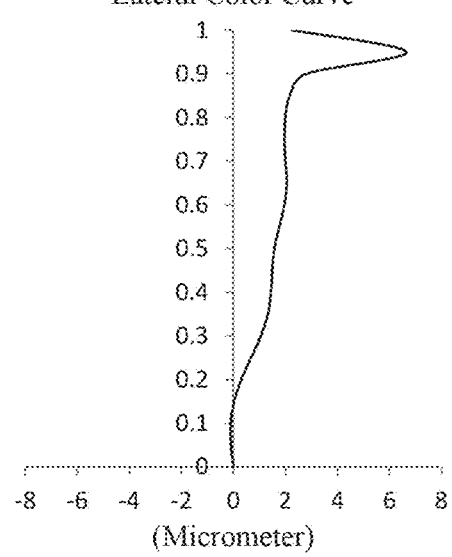

FIG. 12A illustrates a longitudinal aberration curve of the optical imaging system according to example 6, representing deviations of focal points converged by light of different wavelengths after passing through the system. FIG. 12B illustrates an astigmatic curve of the optical imaging system according to example 6, representing a curvature of a tangential plane and a curvature of a sagittal plane. FIG. 12C illustrates a distortion curve of the optical imaging system according to example 6, representing amounts of distortion corresponding to different image heights. FIG. 12D illustrates a lateral color curve of the optical imaging system according to example 6, representing deviations of different image heights on an imaging plane after light passes through the system. It can be seen from FIG. 12A to FIG. 12D that the optical imaging system provided in example 6 may achieve good image quality.

Example 7

Figure 13:
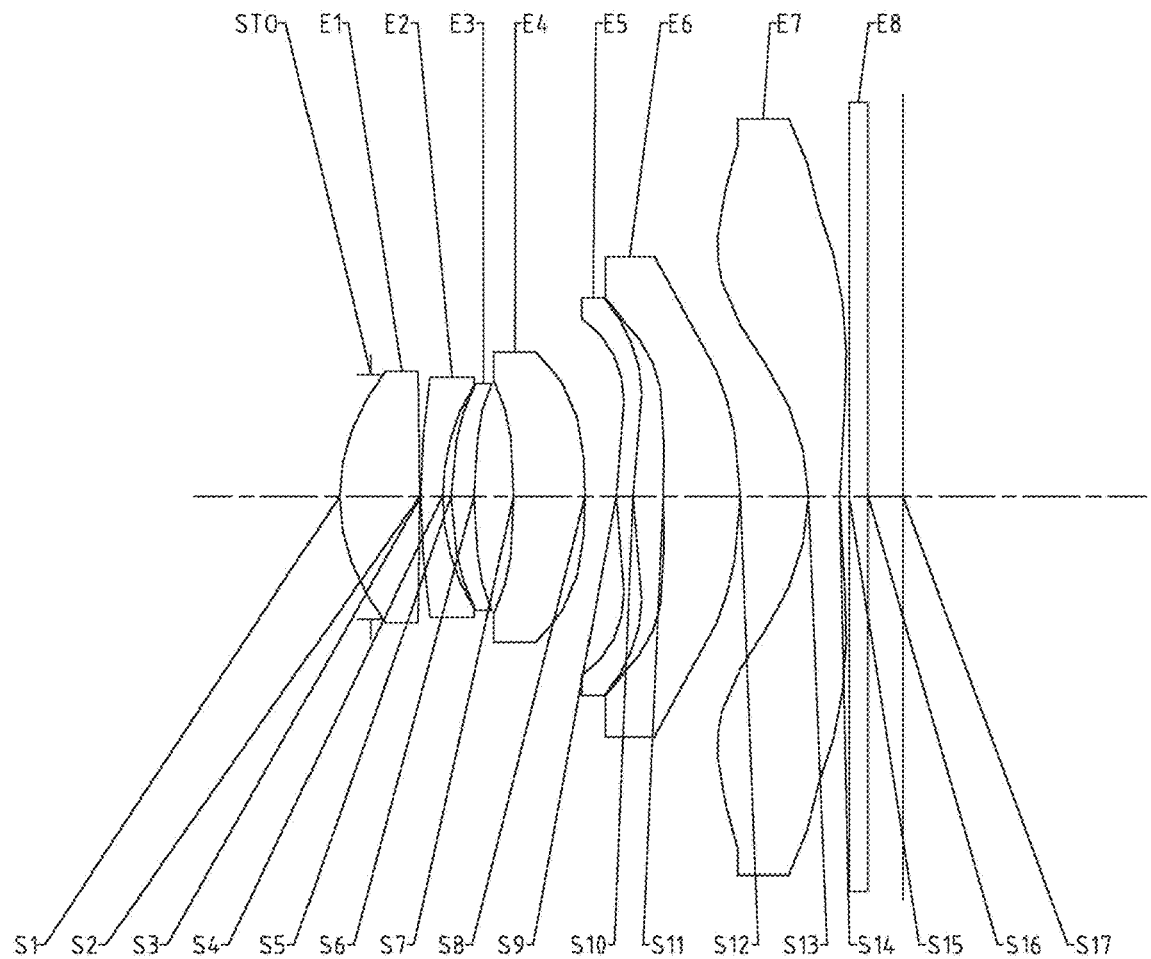
FIG. 13 illustrates a schematic structural view of an optical imaging system according to example 7 of the present disclosure.

An optical imaging system according to example 7 of the present disclosure is described below with reference to FIG. 13 to FIG. 14D. FIG. 13 shows a schematic structural view of the optical imaging system according to example 7 of the present disclosure.

As shown in FIG. 13, the optical imaging system includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is a convex surface, and an image-side surface S2 thereof is a convex surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has positive refractive power, an object-side surface S9 thereof is a convex surface, and an image-side surface S10 thereof is a concave surface. The sixth lens E6 has positive refractive power, an object-side surface S11 thereof is a convex surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface 516. The optical imaging system has an imaging plane 517, and light from an object sequentially passes through the respective surfaces S1 to S16 and is finally imaged on the imaging plane S17.

In example 7, a total effective focal length f of the optical imaging system is 7.38 mm, an on-axis distance TTL from the object-side surface S1 of the first lens E1 to the imaging plane S17 is 8.97 mm, half of a diagonal length ImgH of an effective pixel area on the imaging plane S17 is 6.40 mm, half of a maximal field-of-view Semi-FOV is 40.45°, and an aperture value Fno of the optical imaging system is 1.92.

Table 13 is a table illustrating basic parameters of the optical imaging system of example 7, wherein the units for the radius of curvature, the thickness/distance and the focal length are millimeter (mm). Table 14 shows high-order coefficients applicable to each aspheric surface in example 7, wherein the surface shape of each aspheric surface may be defined by the formula (1) given in the above example 1.

TABLE 13

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −0.5000 | | | | |
| S1 | Aspheric | 3.0415 | 1.2769 | 1.55 | 56.1 | 5.44 | −0.0330 |
| S2 | Aspheric | −105.9596 | 0.0162 | | | | −87.7133 |
| S3 | Aspheric | 11.4253 | 0.3504 | 1.67 | 20.4 | −6.92 | 12.9036 |
| S4 | Aspheric | 3.2492 | 0.1330 | | | | 0.8312 |

TABLE 13-continued

| Surface number | Surface type | Radius of curvature | Thickness/ Distance | Material Refractive index | Abbe number | Focal length | Conic coefficient |
|---|---|---|---|---|---|---|---|
| S5 | Aspheric | 4.5989 | 0.3662 | 1.65 | 23.5 | 18.05 | 2.4482 |
| S6 | Aspheric | 7.3663 | 0.6317 | | | | 3.2235 |
| S7 | Aspheric | −14.9573 | 1.1415 | 1.55 | 56.1 | 89.29 | −31.7933 |
| S8 | Aspheric | −11.7534 | 0.4902 | | | | −42.1456 |
| S9 | Aspheric | 4.0545 | 0.2702 | 1.67 | 20.4 | 89.99 | −2.2747 |
| S10 | Aspheric | 4.2322 | 0.4813 | | | | −1.8006 |
| S11 | Aspheric | 43.9637 | 1.2298 | 1.55 | 56.1 | 8.50 | 43.6475 |
| S12 | Aspheric | −5.1328 | 1.0869 | | | | −0.0345 |
| S13 | Aspheric | −3.1569 | 0.5002 | 1.54 | 55.6 | −4.43 | −0.9565 |
| S14 | Aspheric | 10.1414 | 0.1521 | | | | 1.4288 |
| S15 | Spherical | Infinite | 0.2912 | 1.52 | 64.2 | | |
| S16 | Spherical | Infinite | 0.5542 | | | | |
| S17 | Spherical | Infinite | | | | | |

TABLE 14

| Surface number | A4 | A6 | A8 | A10 | A12 | A14 | A16 | A18 | A20 |
|---|---|---|---|---|---|---|---|---|---|
| S1 | −5.1046E−03 | −6.1570E−03 | −2.3503E−03 | −7.1287E−04 | −2.1211E−04 | −6.2863E−05 | −2.7851E−05 | −1.1791E−05 | −5.2470E−06 |
| S2 | 2.0127E−02 | −1.8666E−02 | 2.6146E−03 | −2.8929E−03 | 5.4045E−04 | −6.6581E−04 | 6.1847E−05 | −6.8439E−05 | 2.6036E−05 |
| S3 | −3.7998E−02 | 4.3745E−03 | 3.7097E−03 | −1.1427E−03 | 6.1821E−04 | −2.6542E−04 | 2.9705E−05 | −3.0887E−05 | 3.8982E−06 |
| S4 | −8.1899E−02 | 8.5805E−03 | −9.1625E−05 | 4.9981E−04 | 4.5037E−05 | 1.1182E−04 | −7.0904E−07 | 8.2212E−06 | −2.9812E−06 |
| S5 | −3.1416E−02 | 6.2952E−03 | −5.8881E−04 | 1.3598E−04 | −1.9087E−04 | 7.6333E−05 | 2.7455E−05 | 1.3029E−05 | 2.4560E−07 |
| S6 | 1.0411E−02 | 1.5388E−02 | 2.2858E−03 | 5.3845E−04 | −1.3662E−04 | −6.1903E−05 | −2.0886E−05 | −4.4672E−06 | −3.3040E−06 |
| S7 | −2.0441E−01 | −4.4772E−03 | 3.6426E−03 | 2.7000E−03 | 1.0308E−03 | 3.8044E−04 | 9.7050E−05 | 2.3982E−05 | 3.2089E−06 |
| S8 | −5.4285E−01 | 1.1967E−02 | −1.1029E−03 | 3.0121E−03 | 6.1622E−05 | 2.7465E−04 | −4.6355E−05 | 5.5839E−06 | −1.5359E−05 |
| S9 | −1.2151E+00 | 7.0653E−02 | −1.4477E−02 | 3.6980E−03 | −3.5037E−03 | −2.2356E−04 | 9.4845E−05 | −2.4322E−05 | −4.1306E−05 |
| S10 | −1.5824E+00 | 1.6761E−01 | −1.4888E−02 | −8.9278E−04 | −1.4514E−04 | 3.3998E−04 | −3.3097E−04 | 2.8143E−05 | |
| S11 | −1.1040E+00 | 1.4095E−02 | 4.8383E−02 | 3.7311E−03 | 3.5934E−03 | −8.3516E−04 | −2.7279E−04 | −1.7782E−04 | −2.5402E−05 |
| S12 | 1.9193E−01 | 4.5730E−02 | 3.1310E−02 | −3.2638E−02 | 1.0734E−02 | 2.1455E−03 | −5.5470E−04 | −6.0310E−06 | 1.5459E−04 |
| S13 | 3.6369E+00 | 2.6020E−02 | −2.0866E−01 | 7.6767E−02 | 5.3008E−03 | −3.0233E−02 | 2.1836E−02 | −9.1198E−03 | 1.6991E−03 |
| S14 | −3.4937E+00 | 5.4897E−01 | −1.1329E−01 | −8.0403E−03 | −3.7266E−02 | −6.7030E−03 | 5.2577E−03 | −3.6402E−03 | 1.5797E−03 |

Figure 14A:
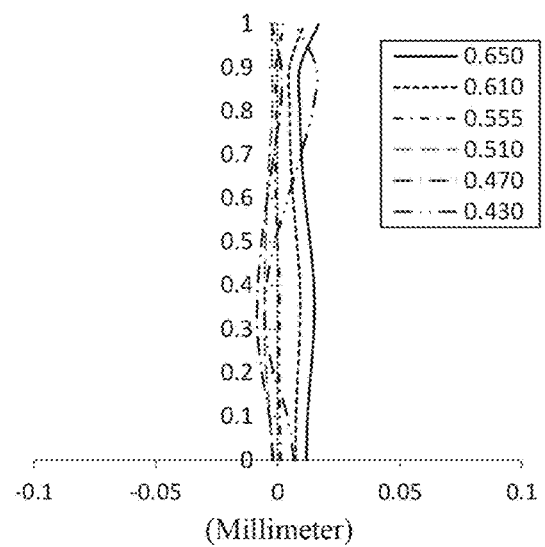
FIGS. 14A to 14D illustrate a longitudinal aberration curve, an astigmatic curve, a distortion curve, and a lateral color curve of the optical imaging system of the example 7, respectively.
Figure 14B:
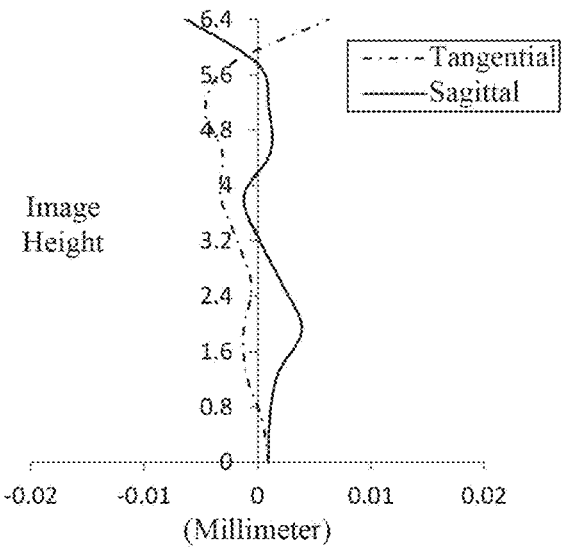
Figure 14C:
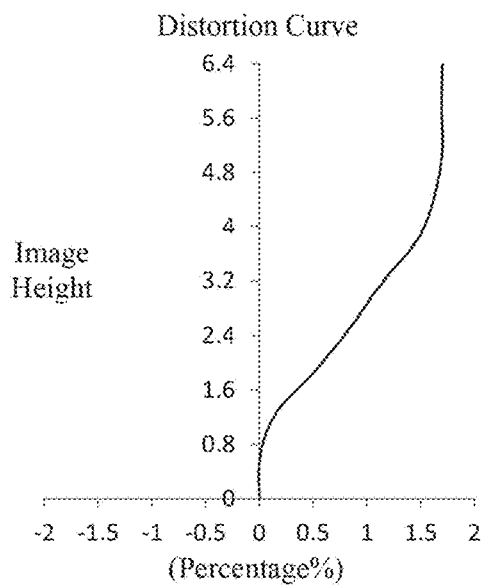
Figure 14D:
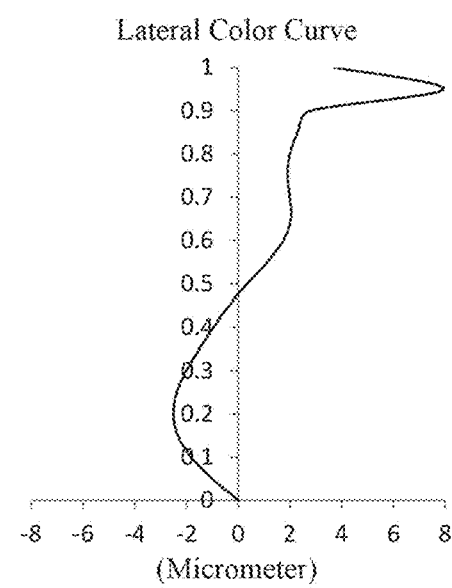

FIG. 14A illustrates a longitudinal aberration curve of the optical imaging system according to example 7, representing deviations of focal points converged by light of different wavelengths after passing through the system. FIG. 14B illustrates an astigmatic curve of the optical imaging system according to example 7, representing a curvature of a tangential plane and a curvature of a sagittal plane. FIG. 14C illustrates a distortion curve of the optical imaging system according to example 7, representing amounts of distortion corresponding to different image heights. FIG. 14D illustrates a lateral color curve of the optical imaging system according to example 7, representing deviations of different image heights on an imaging plane after light passes through the system. It can be seen from FIG. 14A to FIG. 14D that the optical imaging system provided in example 7 may achieve good image quality.

Example 8

Figure 15:
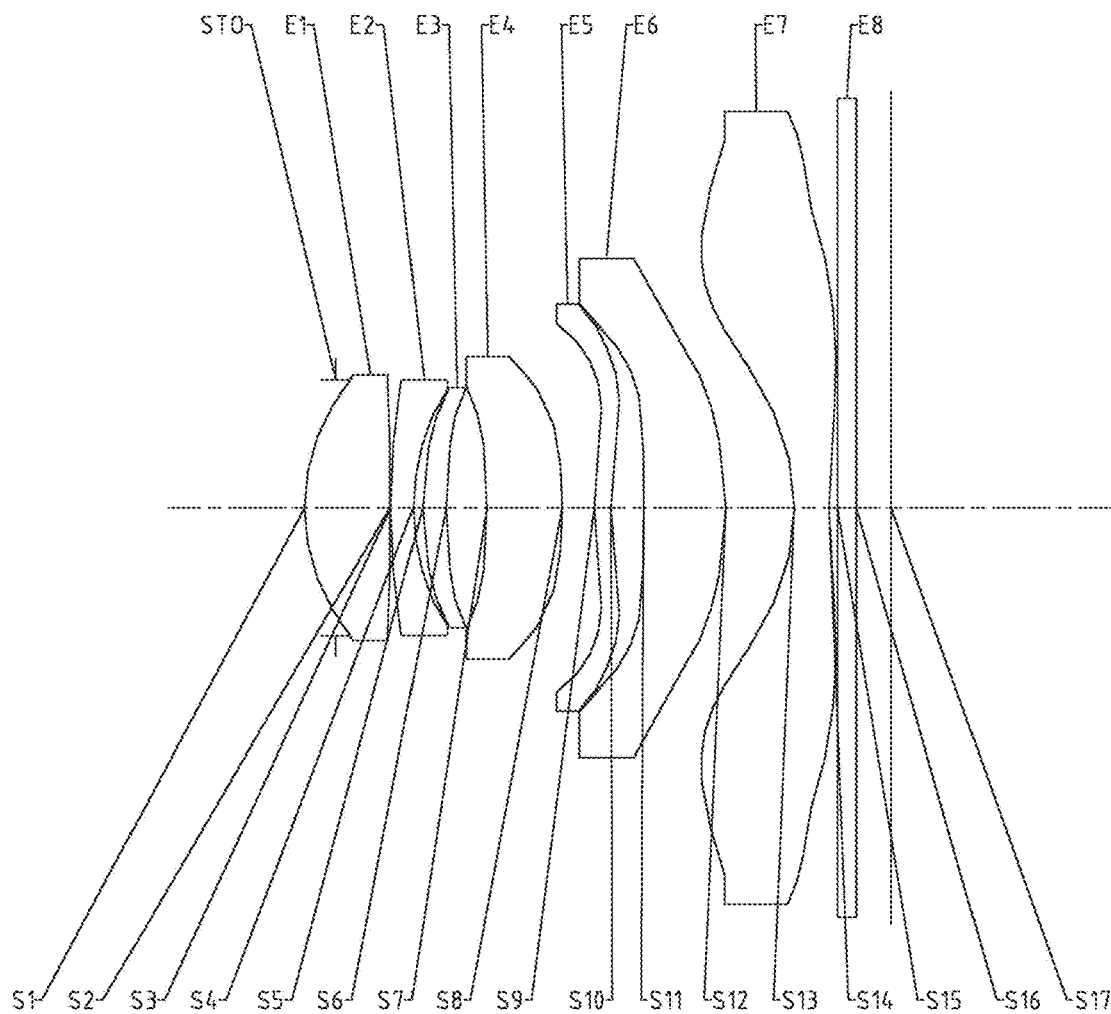
FIG. 15 illustrates a schematic structural view of an optical imaging system according to example 8 of the present disclosure.

An optical imaging system according to example 8 of the present disclosure is described below with reference to FIG. 15 to FIG. 16D. FIG. 15 shows a schematic structural view of the optical imaging system according to example 8 of the present disclosure.

As shown in FIG. 15, the optical imaging system includes a stop STO, a first lens E1, a second lens E2, a third lens E3, a fourth lens E4, a fifth lens E5, a sixth lens E6, a seventh lens E7 and an optical filter E8, which are sequentially arranged from an object side to an image side along an optical axis.

The first lens E1 has positive refractive power, an object-side surface S1 thereof is a convex surface, and an image-side surface S2 thereof is a convex surface. The second lens E2 has negative refractive power, an object-side surface S3 thereof is a convex surface, and an image-side surface S4 thereof is a concave surface. The third lens E3 has positive refractive power, an object-side surface S5 thereof is a convex surface, and an image-side surface S6 thereof is a concave surface. The fourth lens E4 has positive refractive power, an object-side surface S7 thereof is a concave surface, and an image-side surface S8 thereof is a convex surface. The fifth lens E5 has positive refractive power, an object-side surface S9 thereof is a convex surface, and an image-side surface S10 thereof is a concave surface. The sixth lens E6 has positive refractive power, an object-side surface S11 thereof is a concave surface, and an image-side surface S12 thereof is a convex surface. The seventh lens E7 has negative refractive power, an object-side surface S13 thereof is a concave surface, and an image-side surface S14 thereof is a concave surface. The optical filter E8 has an object-side surface S15 and an image-side surface 516. The optical imaging system has an imaging plane 517, and light from an object sequentially passes through the respective surfaces S1 to S16 and is finally imaged on the imaging plane S17.

In example 8, a total effective focal length f of the optical imaging system is 7.69 mm, an on-axis distance TTL from the object-side surface S1 of the first lens E1 to the imaging plane S17 is 9.33 mm, half of a diagonal length ImgH of an effective pixel area on the imaging plane S17 is 6.60 mm, half of a maximal field-of-view Semi-FOV is 39.95°, and an aperture value Fno of the optical imaging system is 1.92.

Table 15 is a table illustrating basic parameters of the optical imaging system of example 8, wherein the units for the radius of curvature, the thickness/distance and the focal length are millimeter (mm). Table 16 shows high-order coefficients applicable to each aspheric surface in example 8, wherein the surface shape of each aspheric surface may be defined by the formula (1) given in the above example 1.

TABLE 15

| Surface number | Surface type | Radius of curvature | Thickness/ Distance | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −0.5000 | | | | |
| S1 | Aspheric | 3.1462 | 1.3586 | 1.55 | 56.1 | 5.60 | −0.0297 |
| S2 | Aspheric | −89.9999 | 0.0166 | | | | −99.0000 |
| S3 | Aspheric | 12.0426 | 0.3539 | 1.67 | 20.4 | −7.17 | 12.5726 |
| S4 | Aspheric | 3.3821 | 0.1473 | | | | 0.8252 |
| S5 | Aspheric | 4.7915 | 0.3738 | 1.65 | 23.5 | 18.97 | 2.4779 |
| S6 | Aspheric | 7.6377 | 0.6476 | | | | 3.4451 |
| S7 | Aspheric | −14.8164 | 1.2050 | 1.55 | 56.1 | 55.35 | −45.3950 |
| S8 | Aspheric | −10.2268 | 0.5081 | | | | −41.3220 |
| S9 | Aspheric | 4.2056 | 0.2682 | 1.67 | 20.4 | 90.00 | −2.5472 |
| S10 | Aspheric | 4.4070 | 0.5196 | | | | −1.9277 |
| S11 | Aspheric | −149.9958 | 1.3016 | 1.55 | 56.1 | 9.55 | −99.0000 |
| S12 | Aspheric | −5.0523 | 1.0944 | | | | −0.1311 |
| S13 | Aspheric | −3.2553 | 0.5498 | 1.54 | 55.6 | −4.57 | −0.9634 |
| S14 | Aspheric | 10.5018 | 0.1371 | | | | 1.5657 |
| S15 | Spherical | Infinite | 0.3003 | 1.52 | 64.2 | | |
| S16 | Spherical | Infinite | 0.5518 | | | | |
| S17 | Spherical | Infinite | | | | | |

TABLE 16

| Surface number | A4 | A6 | A8 | A10 | A12 | A14 | A16 | A18 | A20 |
|---|---|---|---|---|---|---|---|---|---|
| S1 | −8.2289E−03 | −8.1708E−03 | −3.2227E−03 | −1.0182E−03 | −2.9199E−04 | −7.9131E−05 | −2.6568E−05 | −8.9944E−06 | −3.2141E−06 |
| S2 | 1.9283E−02 | −2.2706E−02 | 2.7285E−03 | −3.5038E−03 | 5.6927E−04 | −7.8304E−04 | 1.4468E−04 | −5.2831E−05 | 4.2018E−05 |
| S3 | −4.3738E−02 | 1.0790E−02 | 5.2914E−03 | −1.7391E−03 | 3.9018E−04 | −7.0082E−04 | −4.1376E−06 | −5.8526E−05 | 1.0483E−05 |
| S4 | −9.9791E−02 | 1.4630E−02 | 1.6280E−03 | 1.7135E−03 | 5.4389E−04 | 2.9293E−04 | 2.7431E−05 | 1.6327E−05 | −6.5980E−06 |
| S5 | −3.4296E−02 | 7.9490E−03 | −8.3070E−04 | 2.5253E−05 | −1.6904E−04 | 1.3030E−04 | 4.9694E−05 | 2.3989E−05 | 2.9489E−06 |
| S6 | 2.6354E−02 | 2.3832E−02 | 3.2250E−03 | 5.8384E−05 | −5.5173E−04 | −2.1601E−04 | −6.6065E−05 | −1.6664E−05 | −4.3572E−06 |
| S7 | −2.2687E−01 | −2.0769E−03 | 6.5009E−03 | 4.3512E−03 | 1.7824E−03 | 6.7007E−04 | 1.9624E−04 | 5.3065E−05 | 1.0873E−05 |
| S8 | −6.3127E−01 | 1.4784E−02 | −2.4952E−03 | 3.5804E−03 | −9.1818E−05 | 2.0140E−04 | −1.4243E−04 | −2.8992E−05 | −2.8379E−05 |
| S9 | −1.4569E+00 | 8.3607E−02 | −2.4587E−02 | −2.0040E−03 | −5.4511E−03 | −5.6731E−04 | −1.3653E−04 | −1.0560E−04 | −9.9834E−05 |
| S10 | −1.6802E+00 | 1.7390E−01 | −1.6530E−02 | −7.1271E−03 | −6.6688E−03 | −4.7278E−04 | 1.7760E−04 | −3.5973E−04 | −8.5924E−05 |
| S11 | −1.0050E+00 | −1.3852E−02 | 5.0250E−02 | 7.2385E−04 | 2.1285E−03 | −1.9985E−04 | −4.3985E−05 | −8.3233E−05 | −1.3774E−06 |
| S12 | 2.8569E−01 | 6.4051E−02 | 3.0653E−02 | −3.2517E−02 | 1.7083E−02 | 2.7090E−03 | −6.5022E−04 | 2.4493E−04 | 3.3190E−04 |
| S13 | 4.4767E+00 | −9.0341E−02 | −2.3807E−01 | 1.0538E−01 | −1.3622E−02 | −2.8602E−02 | 2.6640E−02 | −1.4651E−02 | 4.3918E−03 |
| S14 | −3.7783E+00 | 5.4055E−01 | −1.8743E−01 | −3.7572E−02 | −4.9450E−02 | −6.1113E−03 | 4.0823E−03 | −4.0054E−03 | 2.1630E−03 |

Figure 16A:
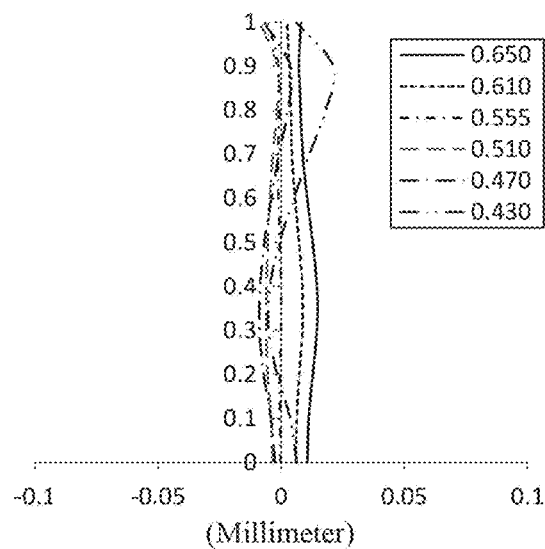
FIGS. 16A to 16D illustrate a longitudinal aberration curve, an astigmatic curve, a distortion curve, and a lateral color curve of the optical imaging system of the example 8, respectively.
Figure 16B:
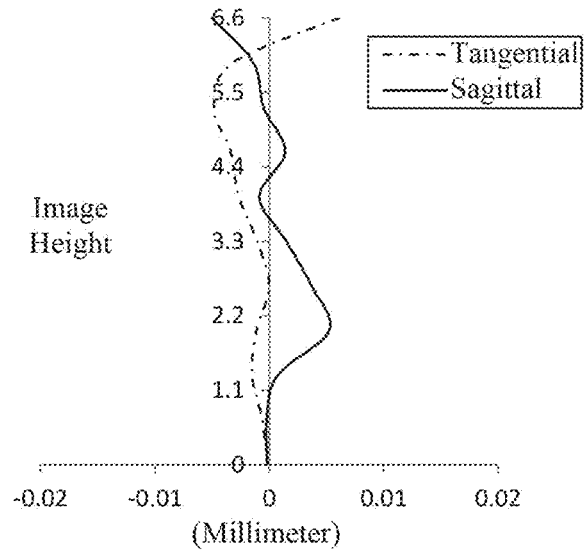
Figure 16C:
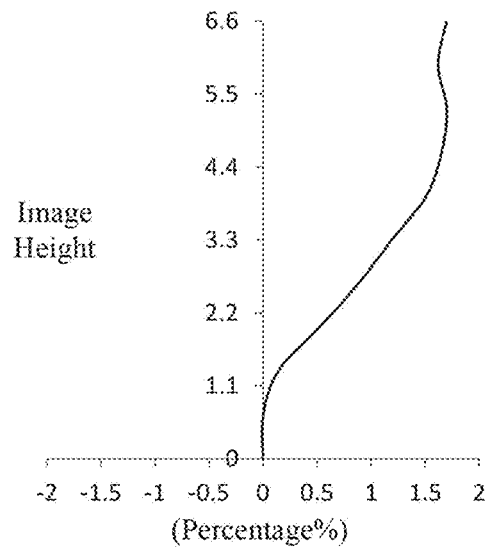
Figure 16D:
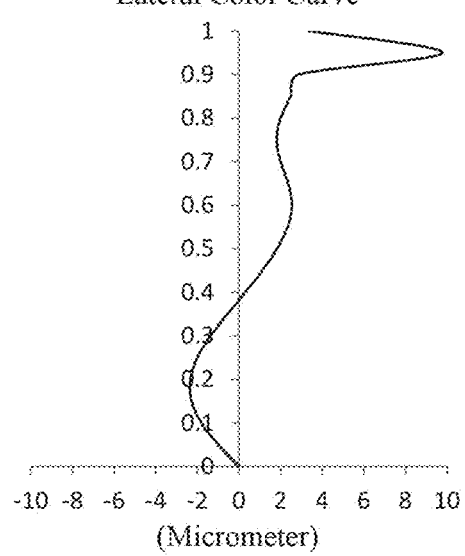

FIG. 16A illustrates a longitudinal aberration curve of the optical imaging system according to example 8, representing deviations of focal points converged by light of different wavelengths after passing through the system. FIG. 16B illustrates an astigmatic curve of the optical imaging system according to example 8, representing a curvature of a tangential plane and a curvature of a sagittal plane. FIG. 16C illustrates a distortion curve of the optical imaging system according to example 8, representing amounts of distortion corresponding to different image heights. FIG. 16D illustrates a lateral color curve of the optical imaging system according to example 8, representing deviations of different image heights on an imaging plane after light passes through the system. It can be seen from FIG. 16A to FIG. 16D that the optical imaging system provided in example 8 may achieve good image quality.

In view of the above, examples 1 to 8 respectively satisfy the relationship shown in Table 17.

TABLE 17

| Conditional/ Example | 1 | 2 | 3 | 4 | 5 | 6 | 7 | 8 |
|---|---|---|---|---|---|---|---|---|
| f2/f7 | 1.89 | 1.69 | 1.65 | 1.78 | 1.74 | 1.58 | 1.56 | 1.57 |
| f3/f | 2.64 | 2.26 | 2.16 | 2.31 | 2.56 | 2.43 | 2.45 | 2.47 |
| f6/f1 | 1.15 | 1.49 | 1.51 | 1.29 | 1.16 | 1.37 | 1.56 | 1.71 |
| R3/R4 | 2.52 | 3.01 | 3.12 | 2.78 | 2.64 | 3.55 | 3.52 | 3.56 |
| R6/R5 | 1.49 | 1.61 | 1.65 | 1.60 | 1.51 | 1.63 | 1.60 | 1.59 |
| R7/R8 | 1.62 | 1.59 | 1.52 | 1.89 | 1.61 | 1.53 | 1.27 | 1.45 |
| R12/R13 | 1.59 | 1.47 | 1.59 | 1.29 | 3.08 | 1.72 | 1.63 | 1.55 |
| (R1 + R9)/R10 | 1.71 | 1.57 | 1.55 | 1.71 | 2.03 | 1.91 | 1.68 | 1.67 |
| CT1/CT2 | 3.44 | 3.47 | 3.68 | 3.07 | 3.11 | 3.34 | 3.64 | 3.84 |

TABLE 17-continued

| Conditional/Example | 1 | 2 | 3 | 4 | 5 | 6 | 7 | 8 |
|---|---|---|---|---|---|---|---|---|
| CT4/CT3 | 1.64 | 2.31 | 2.43 | 2.12 | 2.56 | 2.98 | 3.12 | 3.22 |
| CT6/CT7 | 1.31 | 1.62 | 1.68 | 2.04 | 2.30 | 2.80 | 2.46 | 2.37 |
| T67/T56 | 2.05 | 1.88 | 1.63 | 2.97 | 3.51 | 2.99 | 2.26 | 2.11 |
| T34/T45 | 1.04 | 1.05 | 1.18 | 0.92 | 1.12 | 1.08 | 1.29 | 1.27 |

The present disclosure further provides an imaging apparatus with an electronic photosensitive element for imaging. The electronic photosensitive element may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging system described above.

The foregoing is only a description of the preferred examples of the present disclosure and the applied technical principles. It should be appreciated by those skilled in the art that the protective scope of the present disclosure is not limited to the technical solutions formed by the particular combinations of the above technical features. The protective scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging system, comprising, sequentially arranged from an object side to an image side of the optical imaging system along an optical axis, a first lens, a second lens, a third lens, a fourth lens, a fifth lens, a sixth lens and a seventh lens, each of which has refractive power,
   wherein,
   each of the first lens, the third lens and the fourth lens has positive refractive power,
   wherein ImgH>5 mm,
   $2.0<f3/f<3.0$, and
   $1.5<T67/T56<3.6$,
   where ImgH is half of a diagonal length on an imaging plane of the optical imaging system, f is a total effective focal length of the optical imaging system, f3 is an effective focal length of the third lens, T56 is a spaced interval between the fifth lens and the sixth lens along the optical axis, and T67 is a spaced interval between the sixth lens and the seventh lens along the optical axis.

2. The optical imaging system according to claim 1, wherein $1.5<f2/f7<2.0$, where f2 is an effective focal length of the second lens, and f7 is an effective focal length of the seventh lens.

3. The optical imaging system according to claim 1, wherein $1.1<f6/f1<2.0$, where f1 is an effective focal length of the first lens, and f6 is an effective focal length of the sixth lens.

4. The optical imaging system according to claim 1, wherein $2.5<R3/R4<4.0$, where R3 is a radius of curvature of an object-side surface of the second lens, and R4 is a radius of curvature of an image-side surface of the second lens.

5. The optical imaging system according to claim 1, wherein $1.0<R7/R8<2.0$, where R7 is a radius of curvature of an object-side surface of the fourth lens, and R8 is a radius of curvature of an image-side surface of the fourth lens.

6. The optical imaging system according to claim 1, wherein $1.2<R12/R13<3.1$, where R12 is a radius of curvature of an image-side surface of the sixth lens, and R13 is a radius of curvature of an object-side surface of the seventh lens.

7. The optical imaging system according to claim 1, wherein $1.5<(R1+R9)/R10<2.5$,
   where R1 is a radius of curvature of an object-side surface of the first lens, R9 is a radius of curvature of an object-side surface of the fifth lens, and R10 is a radius of curvature of an image-side surface of the fifth lens.

8. The optical imaging system according to claim 1, wherein $3.0<CT1/CT2<4.0$, where CT1 is a center thickness of the first lens along the optical axis, and CT2 is a center thickness of the second lens along the optical axis.

9. The optical imaging system according to claim 1, wherein $1.5<CT4/CT3<3.5$, where CT4 is a center thickness of the fourth lens along the optical axis, and CT3 is a center thickness of the third lens along the optical axis.

10. The optical imaging system according to claim 1, wherein $1.3<CT6/CT7\leq2.8$, where CT6 is a center thickness of the sixth lens along the optical axis, and CT7 is a center thickness of the seventh lens along the optical axis.

11. The optical imaging system according to claim 1, wherein $0.5<T34/T45<1.5$, where T34 is a spaced interval between the third lens and the fourth lens along the optical axis, and T45 is a spaced interval between the fourth lens and the fifth lens along the optical axis.

12. The optical imaging system according to claim 1, wherein $n2>1.6$, $n3>1.6$, and $n5>1.6$,
   where n2 is a refractive index of the second lens, n3 is a refractive index of the third lens, and n5 is a refractive index of the fifth lens.

13. An optical imaging system, comprising, sequentially arranged from an object side to an image side of the optical imaging system along an optical axis, a first lens, a second lens, a third lens, a fourth lens, a fifth lens, a sixth lens and a seventh lens, each of which has refractive power,
   wherein,
   each of the first lens, the third lens and the fourth lens has positive refractive power,
   wherein ImgH>5 mm, and
   $1.4<R6/R5<2.0$,
   where ImgH is half of a diagonal length on an imaging plane of the optical imaging system, R5 is a radius of curvature of an object-side surface of the third lens, and R6 is a radius of curvature of an image-side surface of the third lens.

14. The optical imaging system according to claim 13, wherein $1.5<f2/f7<2.0$, where f2 is an effective focal length of the second lens, and f7 is an effective focal length of the seventh lens.

15. The optical imaging system according to claim 13, wherein $1.1<f6/f1<2.0$, where f1 is an effective focal length of the first lens, and f6 is an effective focal length of the sixth lens.

16. The optical imaging system according to claim 13, wherein $1.5<(R1+R9)/R10<2.5$,
   where R1 is a radius of curvature of an object-side surface of the first lens, R9 is a radius of curvature of an object-side surface of the fifth lens, and R10 is a radius of curvature of an image-side surface of the fifth lens.

17. The optical imaging system according to claim 13, wherein $3.0<CT1/CT2<4.0$, where CT1 is a center thickness of the first lens along the optical axis, and CT2 is a center thickness of the second lens along the optical axis.

18. The optical imaging system according to claim 13, wherein 1.5<CT4/CT3<3.5, where CT4 is a center thickness of the fourth lens along the optical axis, and CT3 is a center thickness of the third lens along the optical axis.

19. The optical imaging system according to claim 13, wherein 1.3<CT6/CT7≤ 2.8, where CT6 is a center thickness of the sixth lens along the optical axis, and CT7 is a center thickness of the seventh lens along the optical axis.

\* \* \* \* \*